(12) United States Patent
Iijima

(10) Patent No.: US 8,807,740 B2
(45) Date of Patent: Aug. 19, 2014

(54) CONVEYING DEVICE AND INKJET RECORDING APPARATUS

(71) Applicant: Brother Kogyo Kabushiki Kaisha, Nagoya (JP)

(72) Inventor: Shota Iijima, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/033,637

(22) Filed: Sep. 23, 2013

(65) Prior Publication Data

US 2014/0092187 A1 Apr. 3, 2014

(30) Foreign Application Priority Data

Sep. 28, 2012 (JP) ................................. 2012-218621

(51) Int. Cl.
*B41J 2/01* (2006.01)
*B65G 13/02* (2006.01)
*B41J 11/00* (2006.01)

(52) U.S. Cl.
CPC ............... *B41J 11/007* (2013.01); *B65G 13/02* (2013.01)
USPC ............ 347/104; 347/101; 198/780; 198/779

(58) Field of Classification Search
USPC ............................ 347/104, 101; 198/780, 779
See application file for complete search history.

(56) References Cited

FOREIGN PATENT DOCUMENTS

| JP | H11-138928 | A | 5/1999 |
|----|------------|---|--------|
| JP | 2002-326750 | A | 11/2002 |
| JP | 2006-15521 | A | 1/2006 |
| JP | 2010-202300 | A | 9/2010 |
| JP | 2011-136803 | A | 7/2011 |

*Primary Examiner* — Henok Legesse
(74) *Attorney, Agent, or Firm* — Merchant & Gould PC

(57) ABSTRACT

A conveying device includes: first rollers; second rollers; and a roller holder. Each first roller is movable along a conveying direction of a sheet between a first position and a second position. The roller holder includes: a roller accommodating portion; an abutment member; and a slide portion. The abutment member is movable along the conveying direction between a third position and a fourth position. The abutment member moves each first roller from the first position to the second position while moving from the third position to the fourth position, and moves each first roller from the second position to the first position while moving from the fourth position to the third position. The slide portion is movable along an arrayed direction of the first rollers between a fifth position and a sixth position. The slide portion is moved from the fifth position to the sixth position to move the abutment member from the third position to the fourth position, and moved from the sixth position to the fifth position to move the abutment member from the fourth position to the third position.

10 Claims, 11 Drawing Sheets

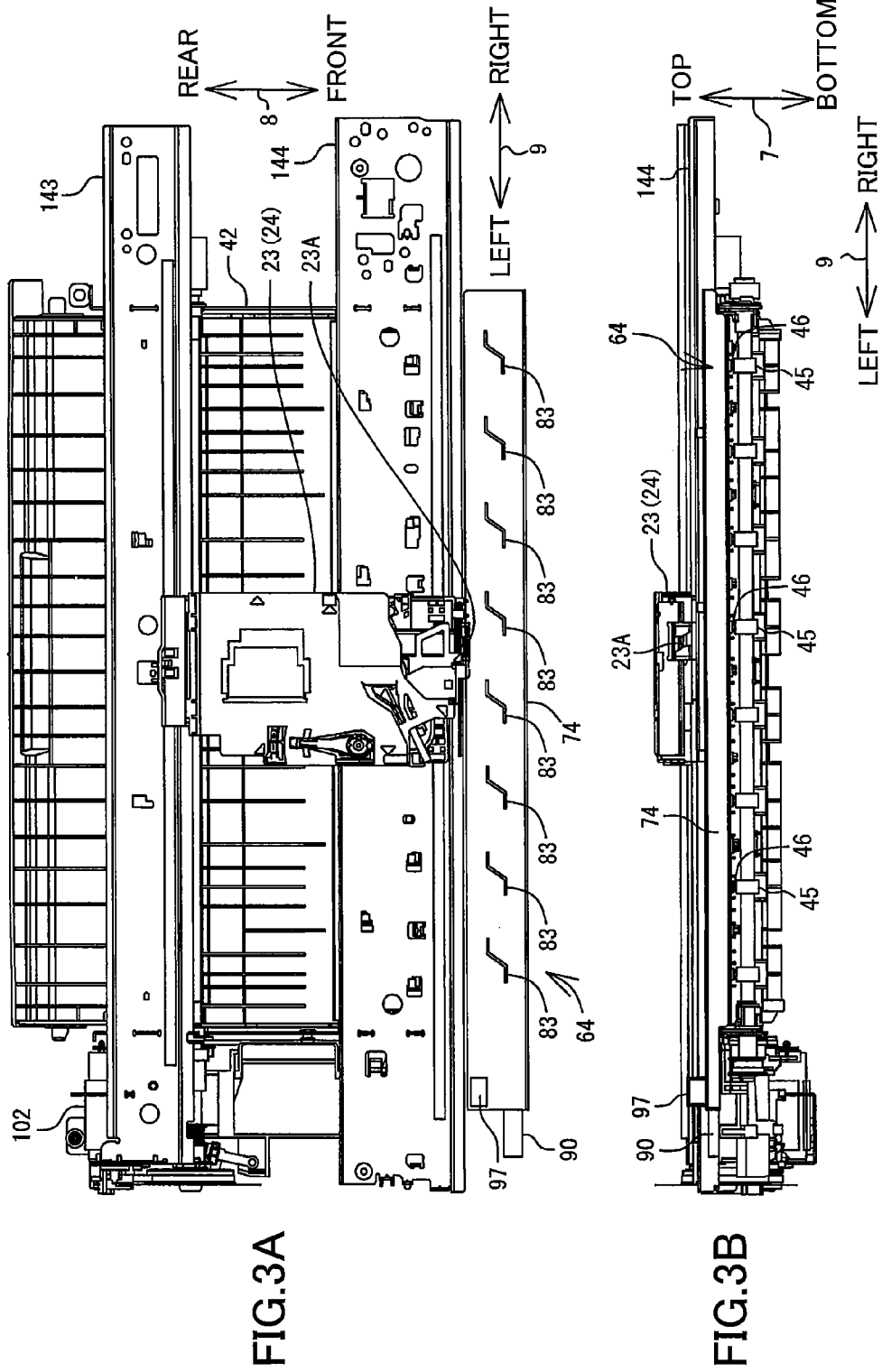

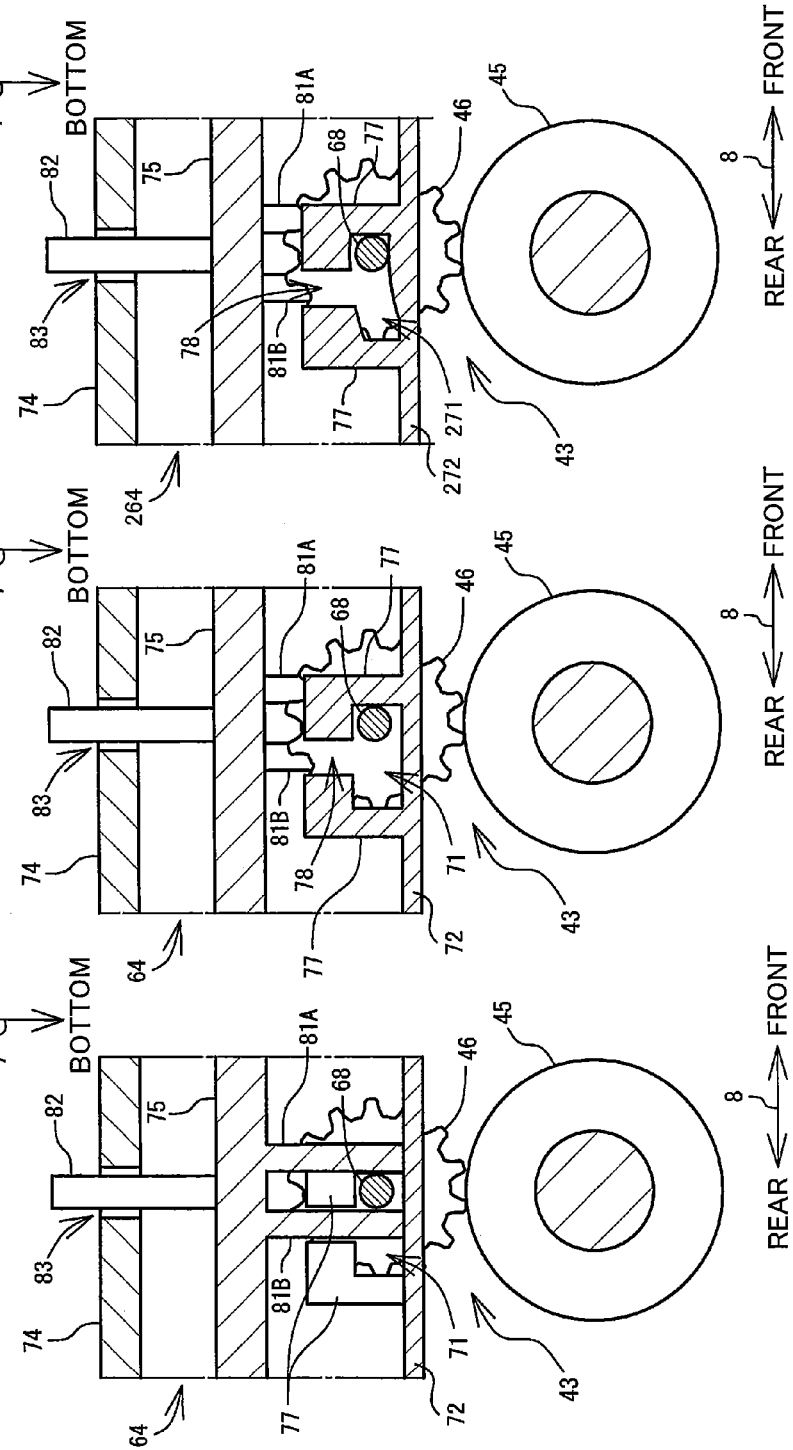

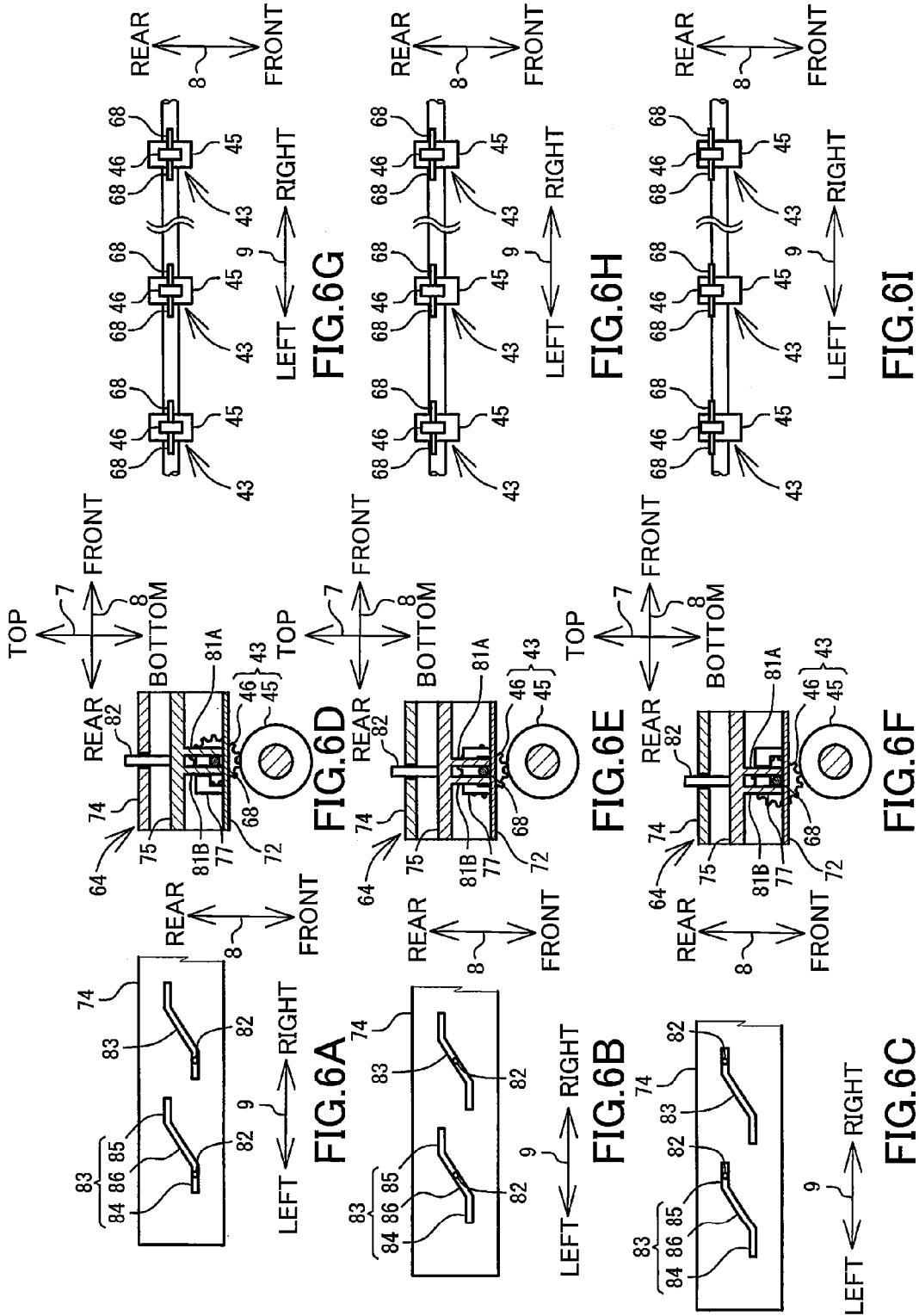

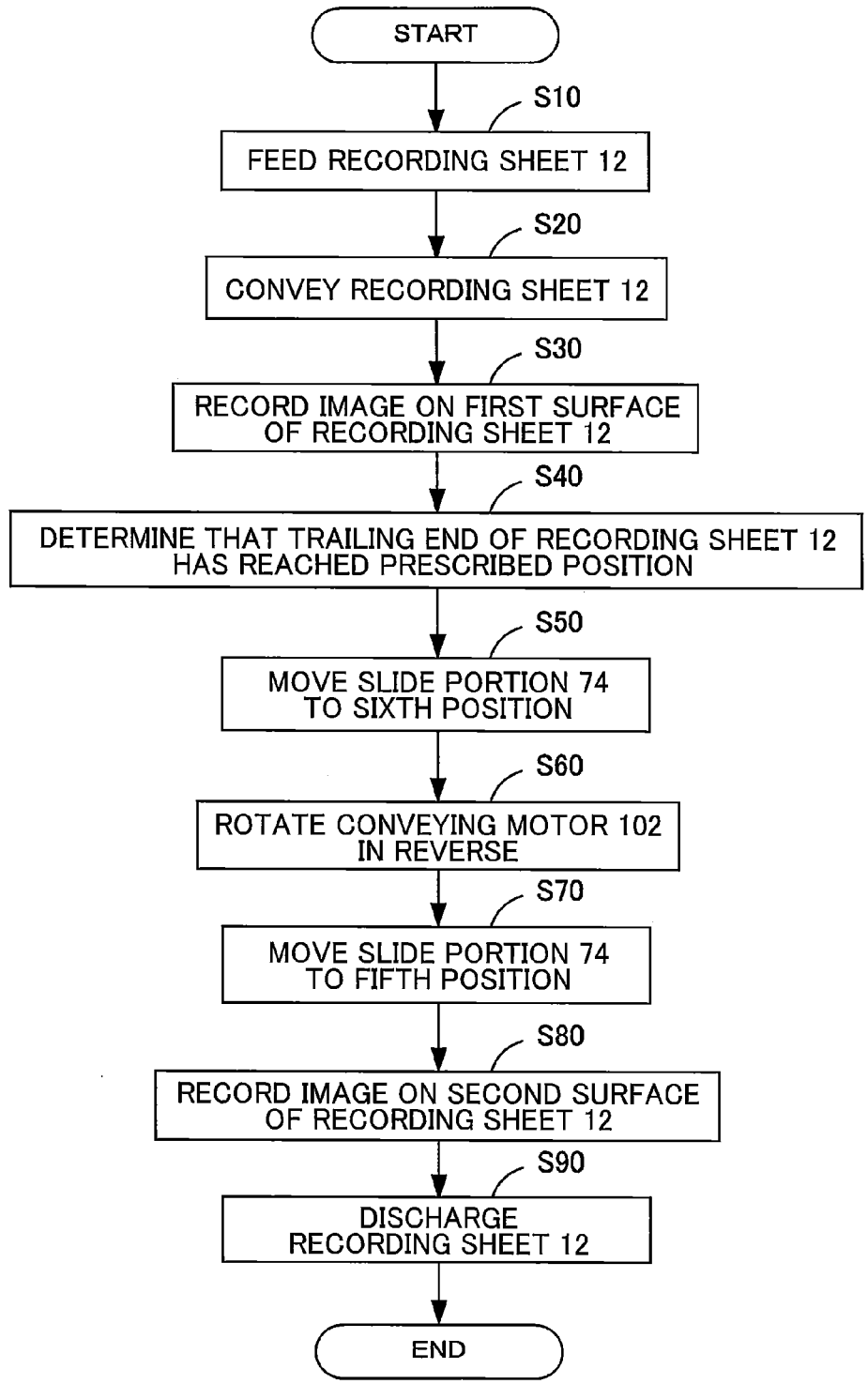

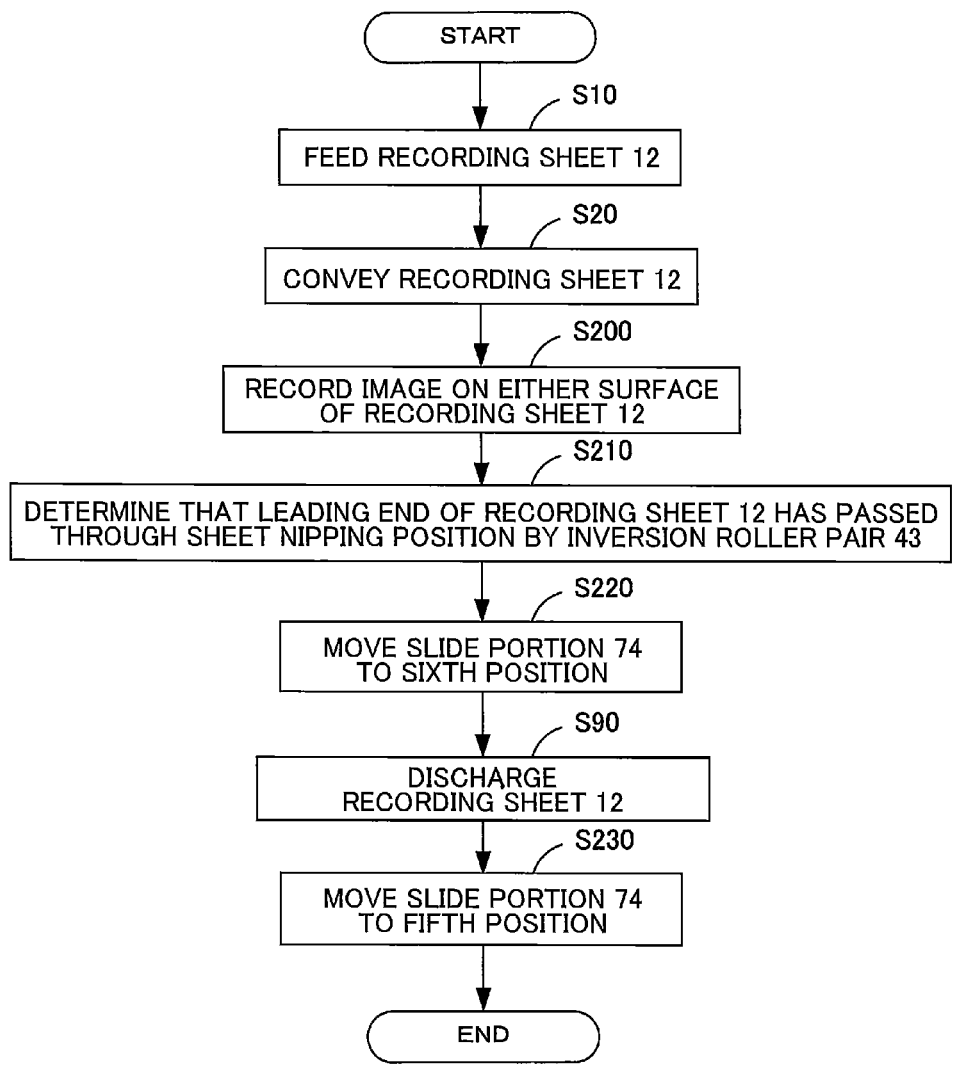

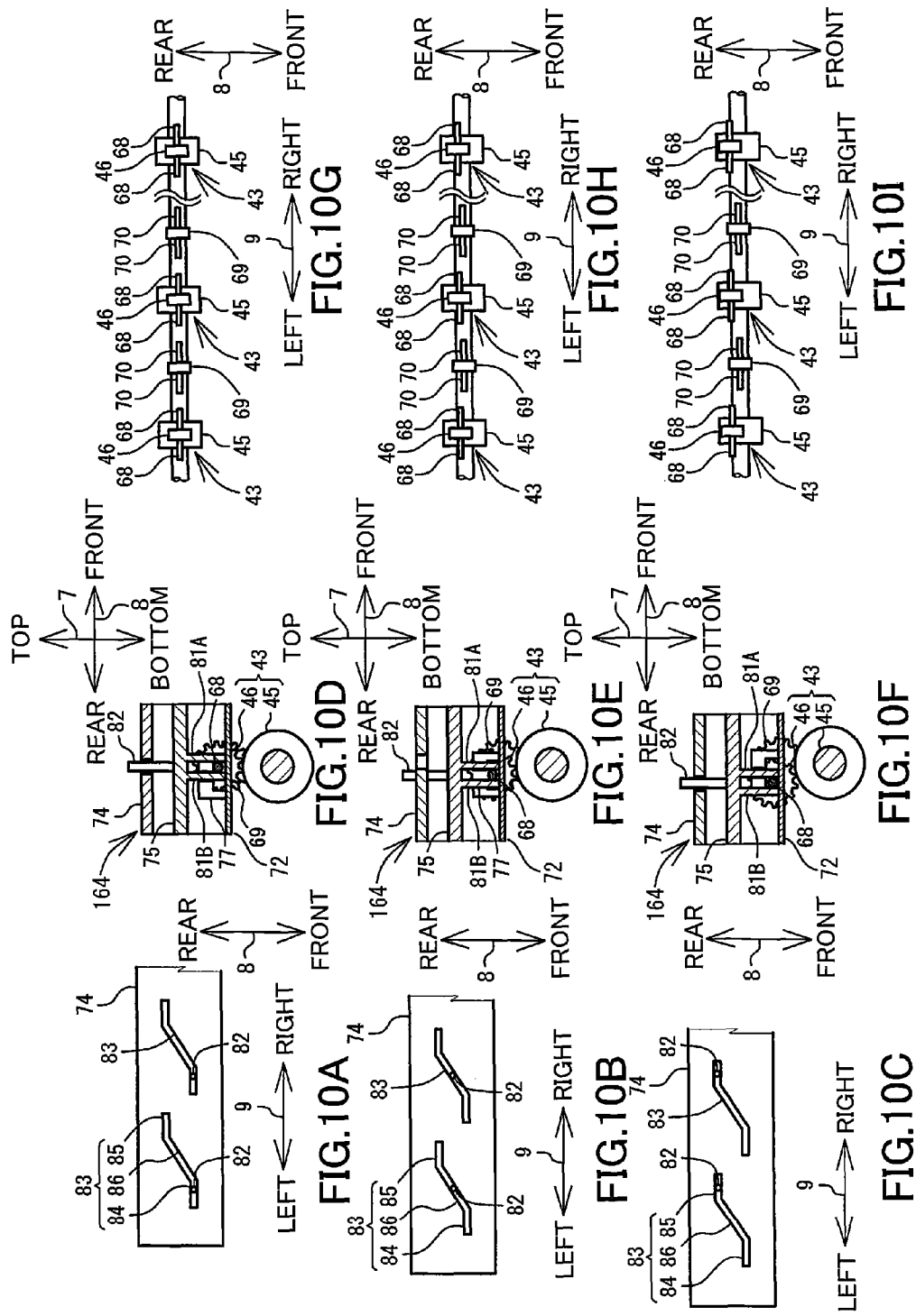

CONVEYING DEVICE AND INKJET RECORDING APPARATUS

CROSS REFERENCE TO RELATED APPLICATION

This application claims priority from Japanese Patent Application No. 2012-218621 filed Sep. 28, 2012. The entire content of the priority application is incorporated herein by reference.

TECHNICAL FIELD

The present invention relates to a conveying device that conveys a sheet along a conveying path, and an inkjet recording apparatus comprising the conveying device and configured to record an image onto the sheet conveyed along the conveying path.

BACKGROUND

The conveying device as described above includes a roller pair including an upper roller and a lower roller. The upper roller is provided at an upper side of the conveying path. The lower roller is provided at a lower side of the conveying path so as to confront the upper roller. The roller pair conveys a sheet while nipping the sheet therebetween.

There is conventionally known an image forming apparatus in which a sheet nipping angle at which the sheet is nipped between a roller pair with respect to a reference direction can be varied according to a situation. As a mechanism for varying the sheet nipping angle between the roller pair including a sheet discharge drive roller and a sheet discharge driven roller, there is provided a mechanism that moves a conveying guide supporting the sheet discharge driven roller by rotation of a cam, to move the sheet discharge driven roller relative to the sheet discharge drive roller, and to vary the sheet nipping angle between the sheet discharge drive roller and the sheet discharge driven roller. The conveying guide and the sheet discharge driven roller are moved in the same direction, so that the conveying guide and the sheet discharge driven roller need to be juxtaposed with each other along the moving direction of the sheet discharge driven roller.

SUMMARY

It is an object of the present invention to provide a conveying device capable of moving, in a different way from the known way, a roller in an apparatus in which the conveying device is mounted, and an inkjet recording apparatus comprising the conveying device.

In order to attain the above and other objects, the present invention provides a conveying device configured to convey a recording sheet in a conveying direction including: a plurality of first rollers; a plurality of second rollers; and a roller holder. The plurality of first rollers is arrayed at intervals in an arrayed direction perpendicular to the conveying direction. Each of the plurality of first rollers has a shaft extending in the arrayed direction. The plurality of second rollers is provided in one-to-one correspondence with the plurality of first rollers. Each of the plurality of second rollers is in pressure contact with the corresponding first roller and is configured to convey the recording sheet in the conveying direction while nipping the recording sheet with the corresponding first roller at a nip point. The roller holder is configured to support the plurality of first rollers such that the plurality of first rollers is movable along the conveying direction between a first position and a second position. Each of the plurality of first rollers in the first position and the corresponding second roller define a first tangent line passing through the nip point. Each of the plurality of first rollers in the second position and the corresponding second roller define a second tangent line passing through the nip point. The second tangent line is angled with respect to the first tangent line. The roller holder includes: a roller accommodating portion; an abutment member; and a slide portion. The roller accommodating portion is configured to accommodate the plurality of first rollers therein. The abutment member is supported by the roller accommodating portion so as to be movable along the conveying direction between a third position and a fourth position. The abutment member is configured to abut against each of the shafts of the plurality of first rollers to move each of the plurality of first rollers from the first position to the second position in response to the movement of the abutment member from the third position to the fourth position. The abutment member is further configured to abut against each of the shafts of the plurality of first rollers to move each of the plurality of first rollers from the second position to the first position in response to the movement of the abutment member from the fourth position to the third position. The slide portion is configured to abut against the abutment member. The slide portion is supported by the roller accommodating portion so as to be movable along the arrayed direction between a fifth position and a sixth position. The slide portion is configured to be moved from the fifth position to the sixth position to move the abutment member from the third position to the fourth position. The slide portion is further configured to be moved from the sixth position to the fifth position to move the abutment member from the fourth position to the third position.

According to another aspect, the present invention provides an inkjet recording apparatus including: a conveying device configured to convey a recording sheet in a conveying direction; a recording head; a carriage; and an urging member. The conveying device includes: a plurality of first rollers; a plurality of second rollers; and a roller holder. The plurality of first rollers is arrayed at intervals in an arrayed direction perpendicular to the conveying direction. Each of the plurality of first rollers has a shaft extending in the arrayed direction. The plurality of second rollers is provided in one-to-one correspondence with the plurality of first rollers. Each of the plurality of second rollers is in pressure contact with the corresponding first roller and is configured to convey the recording sheet in the conveying direction while nipping the recording sheet with the corresponding first roller at a nip point. The roller holder is configured to support the plurality of first rollers such that the plurality of first rollers is movable along the conveying direction between a first position and a second position. Each of the plurality of first rollers in the first position and the corresponding second roller define a first tangent line passing through the nip point. Each of the plurality of first rollers in the second position and the corresponding second roller define a second tangent line passing through the nip point. The second tangent line is angled with respect to the first tangent line. The roller holder includes: a roller accommodating portion; an abutment member; and a slide portion. The roller accommodating portion is configured to accommodate the plurality of first rollers therein. The abutment member is supported by the roller accommodating portion so as to be movable along the conveying direction between a third position and a fourth position. The abutment member is configured to abut against each of the shafts of the plurality of first rollers to move each of the plurality of first rollers from the first position to the second position in response to the movement of the abutment member from the third position to the fourth position. The abutment member is further configured to abut against each of the shafts of the plurality of first rollers to move each of the plurality of first rollers from the second position to the first position in response to the movement of the abutment member from the fourth position to the third position. The slide portion is configured to abut against the abutment member. The slide portion is supported by the roller accommodating portion so as to be movable along the arrayed direction between a fifth position and a sixth position. The slide portion is configured to be moved from the fifth position to the sixth position to move the abutment member from the third position to the fourth position. The slide portion is further configured to be moved from the sixth position to the fifth position to move the abutment member from the fourth position to the third position. The recording head is configured to eject ink droplets on the recording sheet. The carriage on which the recording head is mounted is configured to be reciprocatingly moved in the arrayed direction. The urging member is configured to urge the slide portion to the fifth position. The slide portion is moved from the fifth position to the sixth position against an urging force of the urging member by abutting against the carriage moving in the arrayed direction.

BRIEF DESCRIPTION OF THE DRAWINGS

In the drawings;

FIGS. 3A and 3B are schematic views each illustrating a carriage, a platen, guide rails, and a spur movement mechanism provided in the multifunction machine according to the embodiment, in which FIG. 3A is a plan view, and FIG. 3B is a front view;

FIGS. 4A and 4B are partial cross-sectional views each illustrating a part of the spur movement mechanism provided in the multifunction machine according to the embodiment, in which FIG. 4A illustrates a state where a slide portion is situated at a fifth position, and FIG. 4B illustrates a state where the slide portion is situated at a sixth position;

FIG. 5A is a partial cross-sectional view along a line VA-VA in FIG. 4A illustrating a part of the spur movement mechanism provided in the multifunction machine according to the embodiment, and illustrating a state where a spur roller, an abutment member, and the slide portion are situated at a first position, a third position, and the fifth position, respectively;

FIG. 5B is a partial cross-sectional view along a line VB-VB in FIG. 4A illustrating a part of the spur movement mechanism provided in the multifunction machine according to the embodiment, and illustrating a state where the spur roller, the abutment member, and the slide portion are situated at the first position, the third position, and the fifth position, respectively;

FIG. 5C is a partial cross-sectional view illustrating a part of a spur movement mechanism provided in a multifunction machine according to a third modification of the present invention, illustrating a state where a spur roller, an abutment member, and a slide portion are situated at a first position, a third position, and a fifth position, respectively;

FIG. 6A is a schematic partial plan view illustrating a slide portion situated at the fifth position in the multifunction machine according to the embodiment;

FIG. 6B is a schematic partial plan view illustrating a slide portion situated between the fifth and sixth positions in the multifunction machine according to the embodiment;

FIG. 6C is a schematic partial plan view illustrating the slide portion situated at the sixth position in the multifunction machine according to the embodiment;

FIG. 6D is a schematic partial cross-sectional view illustrating the spur movement mechanism when the spur roller and the abutment member are situated at the first position and the third position, respectively, in the multifunction machine according to the embodiment;

FIG. 6E is a schematic partial cross-sectional view illustrating the spur movement mechanism when the spur roller is situated between the first and second positions and the abutment member is situated between the third and fourth positions in the multifunction machine according to the embodiment;

FIG. 6F is a schematic partial cross-sectional view illustrating the spur movement mechanism when the spur roller and the abutment member are situated at the second position and the fourth position, respectively, in the multifunction machine according to the embodiment;

FIG. 6G is a schematic partial plan view illustrating an inversion roller pair when the spur roller is situated at the first position in the multifunction machine according to the embodiment;

FIG. 6H is a schematic partial plan view illustrating the inversion roller pair when the spur roller is situated between the first and second positions in the multifunction machine according to the embodiment;

FIG. 6I is a schematic partial plan view illustrating the inversion roller pair when the spur roller is situated at the second position in the multifunction machine according to the embodiment;

FIG. 8A is a flowchart illustrating steps in image recording control processing in the multifunction machine according to the embodiment;

FIG. 8B is a flowchart illustrating steps in image recording control processing in a multifunction machine according to first and second modifications of the present invention;

FIG. 10A is a schematic partial plan view illustrating a slide portion situated at a fifth position in the multifunction machine according to the first modification;

FIG. 10B is a schematic partial plan view illustrating the slide portion situated between the fifth and sixth positions in the multifunction machine according to the first modification;

FIG. 10C is a schematic partial plan view illustrating the slide portion situated at the sixth position in the multifunction machine according to the first modification;

FIG. 10D is a schematic partial cross-sectional view illustrating the spur movement mechanism when the spur roller and an abutment member are situated at a first position and a third position, respectively, in the multifunction machine according to the first modification;

FIG. 10E is a schematic partial cross-sectional view illustrating the spur movement mechanism when the spur roller is situated between the first and second positions and the abutment member is situated between the third and fourth positions in the multifunction machine according to the first modification;

FIG. 10F is a schematic partial cross-sectional view illustrating the spur movement mechanism when the spur roller and the abutment member are situated at the second position and the fourth position, respectively, in the multifunction machine according to the first modification;

FIG. 10G is a schematic partial plan view illustrating the inversion roller pair when the spur roller is situated at the first position in the multifunction machine according to the first modification;

FIG. 10H is a schematic partial plan view illustrating the inversion roller pair when the spur roller is situated between the first and second positions in the multifunction machine according to the first modification; and FIG. 10I is a schematic partial plan view illustrating the inversion roller pair when the spur roller is situated at the second position in the multifunction machine according to the first modification.

DETAILED DESCRIPTION

Figure 1:
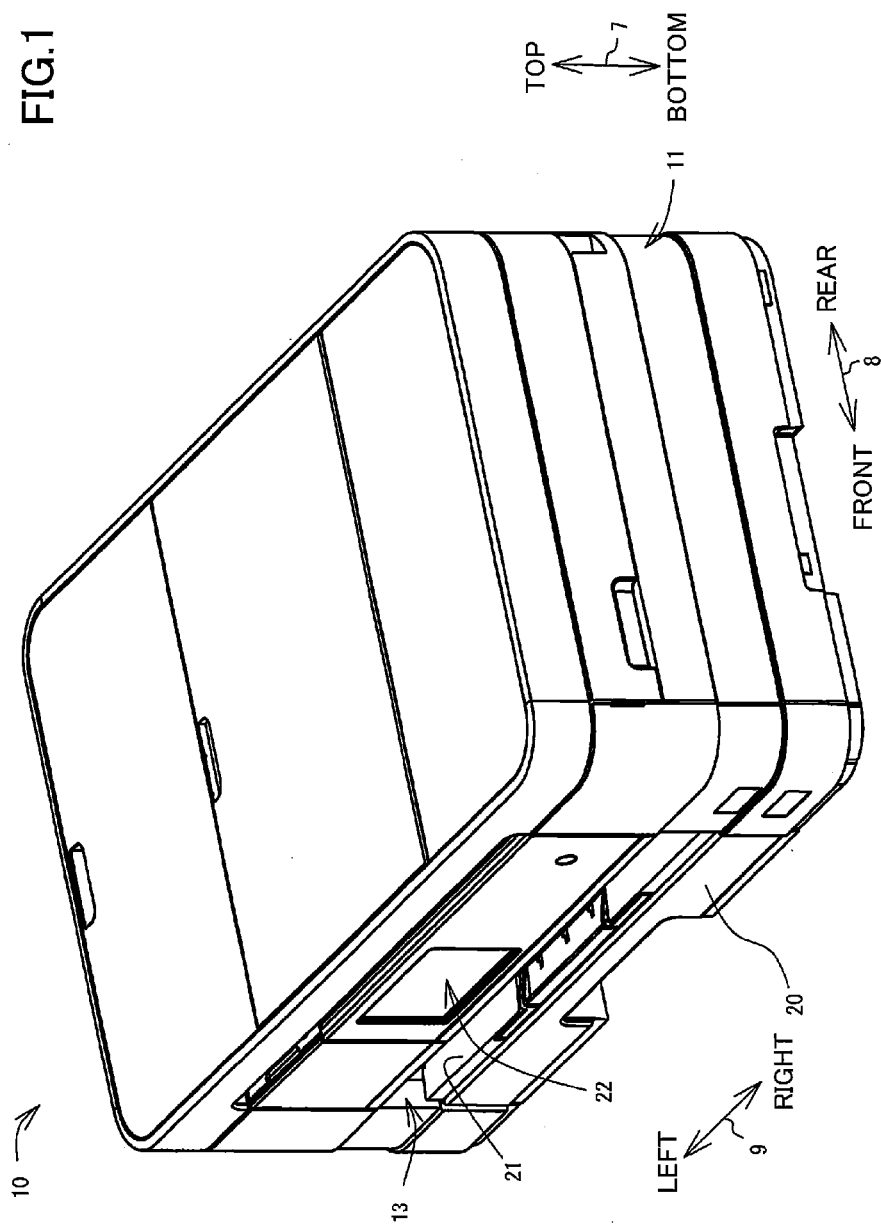
FIG. 1 is a perspective view illustrating an outer appearance of a multifunction machine according to one embodiment of the present invention.

A multifunction machine as an inkjet recording apparatus according to one embodiment of the present invention will be described with reference to FIGS. 1 through 5B and 6A through 8A. Throughout the specification, the terms "upward", "downward", "upper", "lower", "above", "below", "beneath", "right", "left", "front", "rear" and the like will be used assuming that the multifunction machine 10 is disposed in an orientation in which it is intended to be used.

More specifically, an upper-lower direction 7 is defined with reference to an operable state of a multifunction machine 10 (i.e. a state illustrated in FIG. 1), a front-rear direction 8 is defined with a side at which an opening 13 is formed as a front side, and a left-right direction 9 is defined with reference to the front side of the multifunction machine 10.

[Overall Structure of Multifunction Machine 10]

As illustrated in FIG. 1, the multifunction machine 10 is substantially shaped like a rectangular parallelepiped and has, at a lower portion thereof, a printer section 11 that records an image onto a recording sheet 12 (see FIG. 2) by an inkjet recording method. The multifunction machine 10 has various functions such as a facsimile function and a printer function.

The printer section 11 is formed with the opening 13 at its front side. Through the opening 13, a feed tray 20 on which the recording sheets 12 of various sizes can be placed can be inserted and removed in the front-rear direction 8. A discharge tray 21 is provided above the feed tray 20 in a stacked manner thereon. The discharge tray 21 is inserted and removed through the opening 13 in an integrated manner with the feed tray 20. An operation panel 22 is provided at the front side of the multifunction machine 10 above the opening 13.

Figure 2:
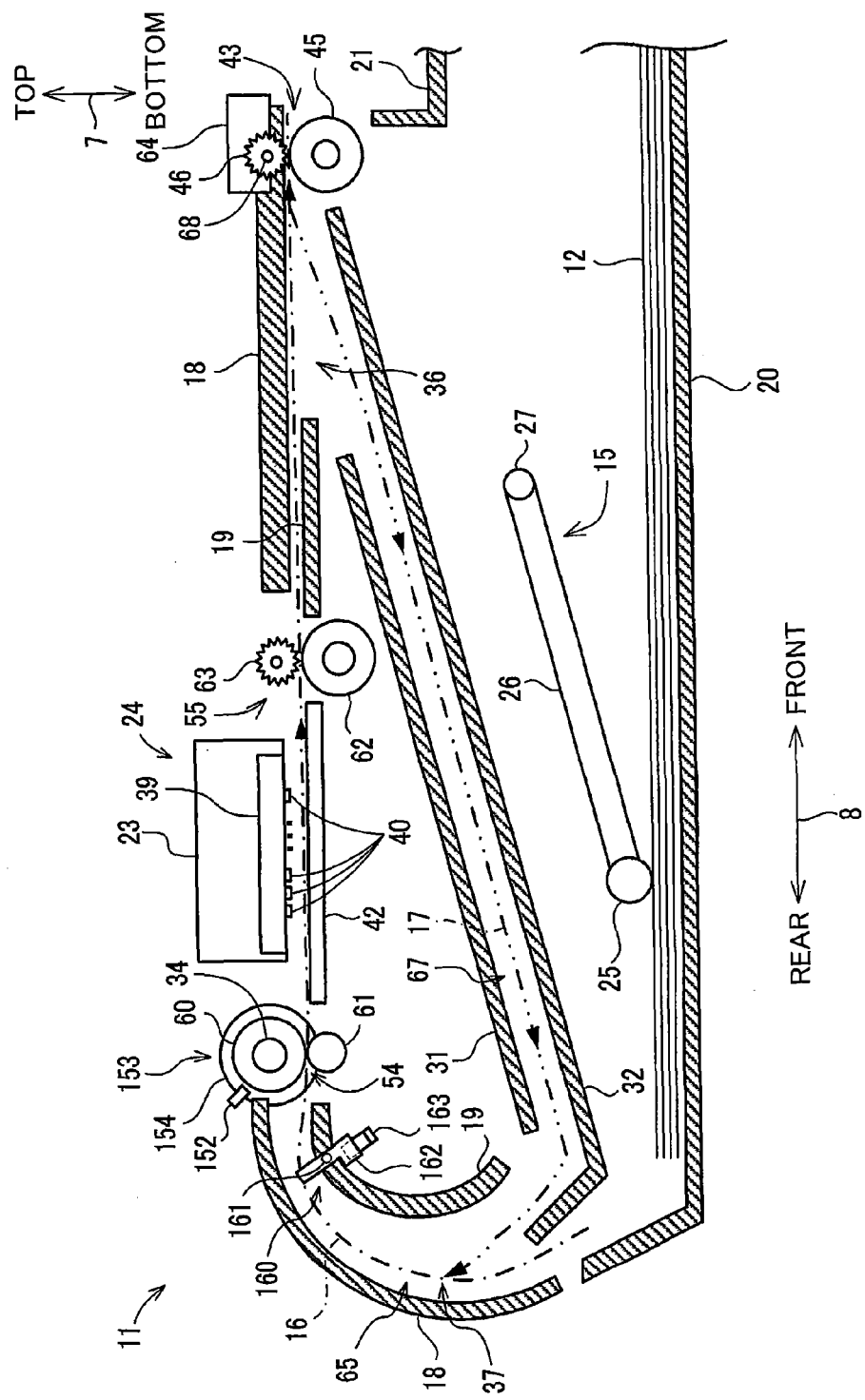
FIG. 2 is a schematic cross-sectional view illustrating an internal structure of a printer section as viewed from a left side of the multifunction machine according to the embodiment.

As illustrated in FIG. 2, the printer section 11 includes a feed section 15 that picks up and feeds the recording sheet 12 from the feed tray 20, a recording section 24 that records an image onto the recording sheet 12 fed by the feed section 15, and a conveying device. The conveying device includes, at least, a conveying roller pair 54 and a discharge roller pair 55 that convey the recording sheet 12, and a spur movement mechanism 64 that moves up and down a spur roller 46 of each discharge roller pair 43. In the present embodiment, the conveying device includes an inversion roller pair 43, in addition to the conveying roller pair 54, the discharge roller pair 55 and the spur movement mechanism 64. Details of the respective components constituting the printer section 11 will be described later.

[Feed Section 15]

As illustrated in FIG. 2, the feed section 15 is provided at an upper portion of the feed tray 20 mounted in the printer section 11 through the opening 13 (see FIG. 1). The feed section 15 includes a feed roller 25, a feed arm 26, and a shaft 27. The feed roller 25 is rotatably provided at a rear end of the feed arm 26. The feed roller 25 is rotated by receiving a driving force from a feed motor 101 (see FIG. 7). The feed arm 26 is angularly rotatably supported by the shaft 27. The shaft 27 is supported by a main frame (not illustrated) of the printer section 11. The feed arm 26 is pivotally urged by its own weight or a resilient force of a spring toward the feed tray 20 side. The feed roller 25 is rotated to pick up the recording sheet 12 placed on the feed tray 20 to thereby feed the recording sheet 12 to a first conveying path 65.

[First Conveying Path 65]

As illustrated in FIG. 2, the first conveying path 65 curves upward from a rear end portion of the feed tray 20 toward the front side of the multifunction machine 10 and extends from the rear side of the multifunction machine 10 to the front side thereof. The first conveying path 65 leads to the discharge tray 21 through a sheet nipping position by the conveying roller pair 54, a lower side of the recording section 24, a sheet nipping position by the discharge roller pair 55, and a sheet nipping position by the inversion roller pair 43. The recording sheet 12 fed from the feed tray 20 is conveyed along a conveying direction 16 denoted by a dashed dotted line arrow in FIG. 2 and guided by the first conveying path 65 upward from the lower portion of the printer section 11 in a U-turn manner to the recording section 24. The recording sheet 12 is subjected to image recording processing by the recording section 24 and then discharged by the inversion roller pair 43 to the discharge tray 21 provided on a downstream side relative to the inversion roller pair 43 in the conveying direction 16.

Thus, the discharge tray 21 is provided on the downstream side relative to the inversion roller pair 43 in the conveying direction 16, and the recording sheet 12 conveyed in the conveying direction 16 by the inversion roller pair 43 is discharged to the discharge tray 21. The first conveying path 65 is defined by an outer guide member 18 and an inner guide member 19 disposed opposite to each other with a predetermined gap therebetween.

[Conveying Roller Pair 54, Discharge Roller Pair 55 and Inversion Roller Pair 43]

As illustrated in FIG. 2, the conveying roller pair 54 including a conveying roller 60 and a pinch roller 61 is provided at the first conveying path 65 on the upstream side relative to the recording section 24 in the conveying direction 16. The conveying roller 60 and the pinch roller 61 contact each other. The pinch roller 61 is in pressure contact with the conveying roller 60 by a spring.

The discharge roller pair 55 including a discharge roller 62 and the spur roller 63 is provided at the first conveying path 65 on the downstream side relative to the recording section 24 in the conveying direction 16. The discharge roller 62 and the spur roller 63 contact each other. The spur roller 63 is in pressure contact with the discharge roller 62 by a spring.

Figure 4A:
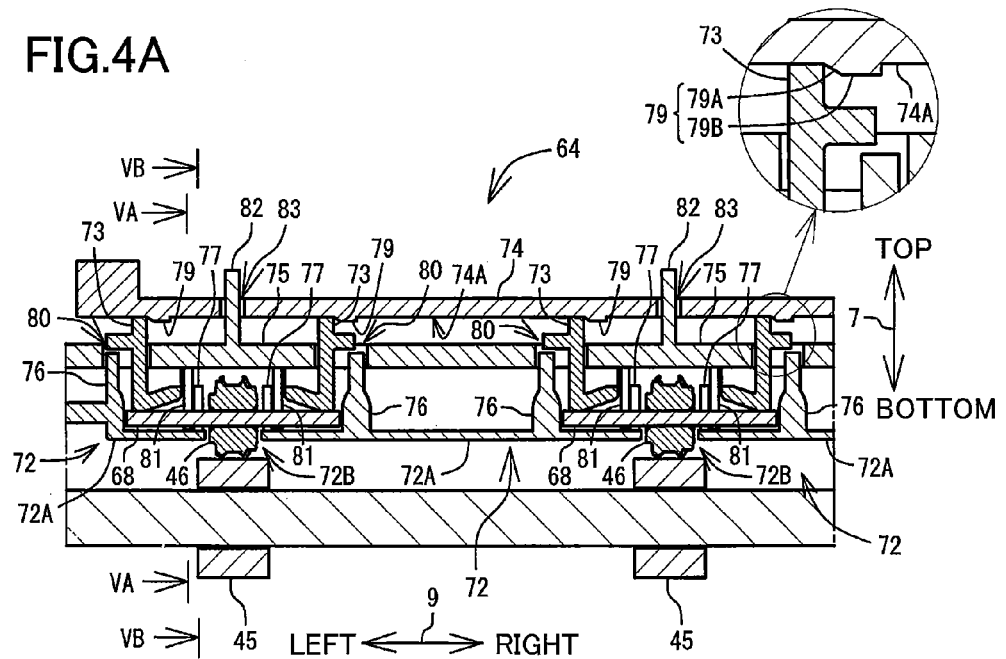
Figure 4B:
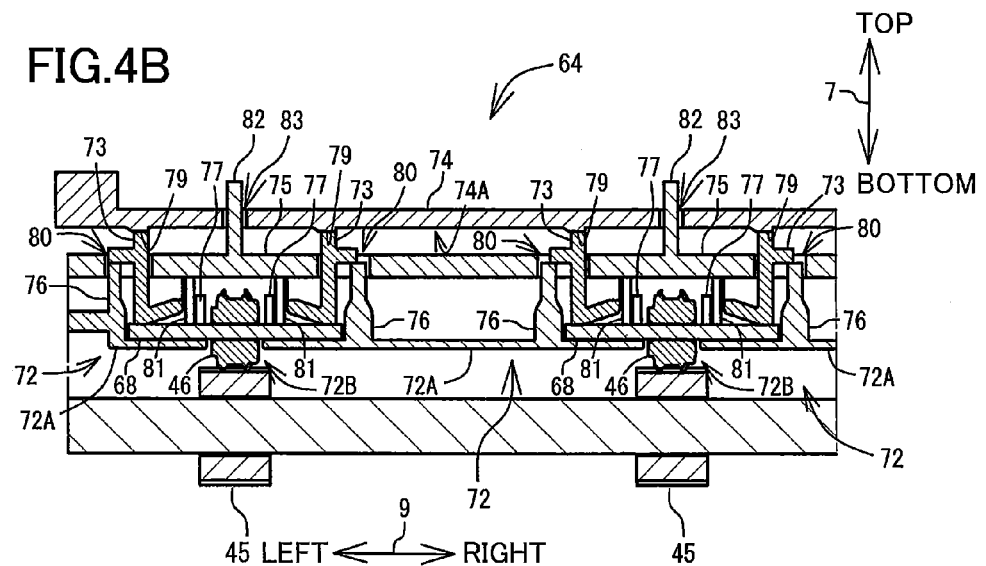

The inversion roller pair 43 including an inversion roller 45 as an example of a second roller and a spur roller 46 as an example of a first roller is provided at the first conveying path 65 on the downstream side relative to the discharge roller pair 55 in the conveying direction 16. As illustrated in FIGS. 4A, 4B and 6G, the spur roller 46 is provided in plural positions in the left-right direction 9 (eight spur rollers 46 in this embodiment), spaced apart from each other. The left-right direction 9 is an example of an arrayed direction. One shaft 68 extends through one spur roller 46. The spur roller 46 is supported at a center portion of the shaft 68 in the left-right direction 9. The shaft 68 is formed of a bar-shaped spring. Each spur roller 46 is disposed above the inversion roller 45. The spur roller 46 and the inversion roller 45 disposed opposite to each other are in pressure contact with each other by an urging force of the spring constituting the shaft 68.

The roller pairs 54, 55, and 43 are rotated while nipping the recording sheet 12 guided along the first conveying path 65, that is, while contacting the recording sheet 12, to thereby convey the recording sheet 12 in the conveying direction 16 and also in a direction opposite to the conveying direction 16. The rollers 60, 62, and 45 are rotated by receiving a driving force from a conveying motor 102 (see FIGS. 3A and 7). When the conveying motor 102 performs normal rotation driving, the rollers 60, 62, and 45 are rotated in a second rotation direction. The second rotation direction is a rotation direction that conveys the recording sheet 12 in the conveying direction 16. When the conveying motor 102 performs reverse rotation driving, the rollers 60, 62, and 45 are rotated in a first rotation direction opposite to second rotation direction. The first rotation direction is a rotation direction that conveys the recording sheet 12 in the direction opposite to the conveying direction 16.

[Recording Section 24]

As illustrated in FIG. 2 and FIGS. 3A and 3B, the recording section 24 is disposed above the first conveying path 65 at a position between the conveying roller pair 54 and the discharge roller pair 55. The recording section 24 includes a carriage 23 and a recording head 39. The carriage 23 is supported by guide rails 143 and 144 provided on both front and rear sides of a platen 42. Both end portions of each of the guide rails 143 and 144 in the left-right direction 9 are fixed to the main frame (not illustrated) of the printer section 11. A known belt mechanism (not illustrated) is provided at at least one of the guide rails 143 and 144, and the carriage 23 is connected to the belt mechanism. The belt mechanism is driven by a carriage drive motor 103 (see FIG. 7, as an example of a drive unit), whereby the carriage 23 can be reciprocatingly moved in the left-right direction 9.

The recording head 39 is mounted on the carriage 23. The recording head 39 has a lower surface provided with a plurality of nozzles 40. Each of the nozzles 40 is adapted to eject ink droplets toward the platen 42 provided below and opposite to the recording head 39. The platen 42 is a member that supports the recording sheet 12. The nozzles 40 each eject the ink droplets to the recording sheet 12 supported on the platen 42 while the carriage 23 is being reciprocated in the left-right direction 9, whereby an image is recorded onto the recording sheet 12.

[Second Conveying Path 67]

A second conveying path 67 is separated from the first conveying path 65 at a first junction 36 as an example of a junction which is positioned on the downstream side relative to the discharge roller pair 55 in the conveying direction 16 and also on the upstream side relative to the inversion roller pair 43 in the conveying direction 16, and joins the first conveying path 65 at a second junction 37 which is positioned on the upstream side relative to the conveying roller pair 54 in the conveying direction 16. That is, the second conveying path 67 merges with the first conveying path 65 at the first and second junctions 36 and 37. The inversion roller pair 43 that is rotated in the first rotation direction conveys the recording sheet 12 along the second conveying path 67 in a conveying direction 17 (denoted by a dashed double-dotted arrow in FIG. 2) from the first junction 36 toward the second junction 37. The second conveying path 67 is defined by guide members 31 and 32.

[Spur Movement Mechanism 64]

As illustrated in FIG. 2, the spur movement mechanism 64 as an example of a roller holder is disposed so as to cover the plurality of spur rollers 46 from above. As illustrated in FIG. 3B, each spur roller 64 is covered by the spur movement mechanism 64 in a state where a lower portion of a peripheral surface thereof is exposed to an outside. As illustrated in FIGS. 4A, 4B and FIGS. 5A, 5B, the spur movement mechanism 64 includes a guide member 72, a shaft pressing portion 73, an abutment member 75, and a slide portion 74. Hereinafter, the members constituting the spur movement mechanism 64 will be described in detail while referring to FIGS. 4A, 4B and FIGS. 5A, 5B. Note that FIGS. 4A and 4B illustrate a part of the spur movement mechanism 64 by extracting the spur roller 46 and its peripheral portion from the spur movement mechanism 64.

[Guide Member 72]

As illustrated in FIGS. 4A, 4B, the guide member 72 as an example of a roller accommodating portion is mounted to the main frame (not illustrated) of the printer section 11. In the present embodiment, the guide member 72 extends in the left-right direction 9, and left and right end portions thereof are fixed to the main frame. The guide member 72 is formed in a generally box-like shape having a top opening, and includes a bottom plate 72A and side plates (not illustrated) standing from left and right end portions of the bottom plate 72A. The shaft pressing portion 73 (described later) and the abutment portion 75 (described later) are accommodated in an internal space defined by the bottom plate 72A and the side plates. The bottom plate 72A of the guide member 72 is formed with slits 72B provided in one-to-one correspondence with the spur rollers 46. The slit 72B has a size slightly greater than a diameter and a width of the spur roller 46. Thus, a lower portion of the spur roller 46 is exposed downward from the bottom plate 72A through the slit 72B.

Two first ribs 76 and two second ribs 77 are provided for each of the spur rollers 46 and stand from the bottom plate 72A of the guide member 72. The first ribs 76 are disposed on both left and right sides of the shaft 68 of the spur roller 46. The second ribs 77 are each disposed between one of the first ribs 76 and the spur roller 46 in the left-right direction 9. The first ribs 76 each support the shaft pressing portion 73 (described later). The second ribs 77 are each formed with a vertical slit 78 extending downward from an upper edge thereof, that is, extending in the upper-lower direction 7. The shaft 68 of the spur roller 46 is inserted downward into the vertical slit 78 from above, whereby the shaft 68 passes through the vertical slit 78 (see FIG. 5B) in the left-right direction 9. Since the vertical slit 78 extends in the upper-lower direction 7, the spur roller 46 can be moved in the upper-lower direction 7. That is, the spur roller 46 is disposed in the guide member 72 so as to be movable in the upper-lower direction 7.

As illustrated in FIGS. 5A and 5B, the second ribs 77 are also each formed with a front-rear slit 71 as an example of a shaft receiving portion extending in the front-rear direction 8 below the vertical slit 78. The shaft 68 inserted into the vertical slits 78 from above is then inserted into the front-rear slits 71. In this state, the shaft 68 can be moved in the front-rear direction 8 inside the front-rear slits 71. The movement of the shaft 68 along the front-rear slits 71 allows the spur roller 46 to be guided to first and second positions to be described below. When the shaft 68 is situated at front end portions of the front-rear slits 71, that is, when the shaft 68 is situated as illustrated in FIGS. 6D and 6G, the spur roller 46 is situated at the first position. On the other hand, when the shaft 68 is situated at rear end portions of the front-rear slits 71, that is, when the shaft 68 is situated as illustrated in FIGS. 6F and 6I, the spur roller 46 is situated at the second position, which is positioned on the upstream side of the first position in the conveying direction 16.

As illustrated in FIG. 6D, when the spur roller 46 is situated at the first position, the recording sheet 12 is nipped between the spur roller 46 and the inversion roller 45 in substantially a horizontal state. That is, when the spur roller 46 is situated at the first position, a sheet nipping angle at which the recording sheet 12 is nipped by the inversion roller pair 43 is substantially 0 (zero) degrees with respect to the horizontal direction. On the other hand, as illustrated in FIG. 6F, when the spur roller 46 is situated at the second position, the recording sheet 12 is inclined at an angle greater than the angle (substantially 0 (zero) degrees) in the state of FIG. 6D. That is, when the spur roller 46 is situated at the second position, a sheet nipping angle at which the recording sheet 12 is nipped by the inversion roller pair 43 with respect to the horizontal direction is greater than the sheet nipping angle when the spur roller 46 is situated at the first position.

In other words, the spur roller 46 situated at the first position and the inversion roller 45 define a first tangent line passing through a nip point where the recording sheet 12 is nipped between the spur roller 46 situated at the first position and the inversion roller 45, and the spur roller 46 situated at the second position and the inversion roller 45 define a second tangent line passing through a nip point where the recording sheet 12 is nipped between the spur roller 46 situated at the second position and the inversion roller 45. The second tangent line is angled with respect to the first tangent line.

In the present embodiment, the recording sheet 12 nipped by the inversion roller pair 43 when the spur roller 46 is situated at the second position is inclined downward toward an upstream end side of the recording sheet 12 in the conveying direction 16, that is, a rear end side thereof. As a result, the rear end (trailing end) of the recording sheet 12 is directed to the second conveying path 67 extending diagonally below and rearward from the first junction 36.

On the other hand, when the second conveying path 67 extends, e.g., diagonally above and rearward from the first junction 36, the recording sheet 12 is preferably inclined upward toward the upstream end side of the recording sheet 12 in the conveying direction 16, that is, the rear end side thereof. As a result, the rear end (trailing end) of the recording sheet 12 is directed to the second conveying path 67.

That is, the inclination direction of the recording sheet 12 is determined depending on which direction the second conveying path 67 extends from the first conveying path 65.

Hence, the guide member 72 is provided such that each spur roller 46 can be guided along the conveying direction 16 to the first position, and to the second position at which the sheet nipping angle between the spur roller 46 and the inversion roller 45 differs from that at the first position.

In other words, each spur roller 46 can be guided by the guide member 72 along the conveying direction 16 to the first position, and to the second position at which the tangent line passing through the nip point between the spur roller 46 and the inversion roller 45 is angled with respect to that at the first position.

As described above, in the present embodiment, the sheet nipping angle with respect to the horizontal direction when the spur roller 46 is situated at the second position is greater than the sheet nipping angle with respect to the horizontal direction when the spur roller 46 is situated at the first position.

In other words, the first tangent line passing through the nip point between the spur roller 46 situated at the first position and the inversion roller 45 forms a first angle with respect to the horizontal direction, and the second tangent line passing through the nip point between the spur roller 46 situated at the second position and the inversion roller 45 forms a second angle with respect to a horizontal direction, which is greater than the first angle.

However, in order to convey the recording sheet 12 to the second conveying path 67, the sheet nipping angle with respect to the horizontal direction when the spur roller 46 is situated at the second position may be smaller than the sheet nipping angle with respect to the horizontal direction when the spur roller 46 is situated at the first position, depending on the arrangement direction of the second conveying path 67 with respect to the first conveying path 65. That is, the angle of the tangent line passing through the nip point between the spur roller 46 situated at the second position and the inversion roller 45 with respect to the horizontal direction may be smaller than the angle of the tangent line passing through the nip point between the spur roller 46 situated at the first position and the inversion roller 45 with respect to the horizontal direction.

[Shaft Pressing Portion 73]

As illustrated in FIGS. 4A and 4B, two shaft press portions 73 are provided for each of the spur rollers 46. The shaft press portions 73 are disposed on both sides of the spur roller 46 in the left-right direction 9 and are opposed to the shaft 68. A lower end portion of each shaft pressing portion 73 abuts against the shaft 68 of the spur roller 46, and an upper end portion thereof abuts against the slide portion 74. The shaft press portions 73 are supported by the guide member 72.

[Abutment Member 75]

As illustrated in FIGS. 4A, 4B and FIGS. 5A, 5B, the abutment member 75 is a plate-like member elongated in the left-right direction 9. The abutment member 75 is formed with a plurality of openings 80. Through each opening 80, the first rib 76 of the guide member 72 and the shaft press portion 73 are inserted.

A plurality of projections 81 projects from a lower surface of the abutment member 75. Four projections 81 are provided for each of the spur rollers 46. As illustrated in FIGS. 4A, 4B and FIGS. 5A and 5B, of the four projections 81, two are front side projections 81A as an example of a first abutment portion and two are rear side projections 81B as an example of a second abutment portion. The front side projections 81A are positioned on the front side of the shaft 68 at the left and right of each spur roller 46. The rear side projections 81B are positioned on the rear side of the shaft 68 at the left and right of each spur roller 46. The front side projections 81A and the rear side projections 81B confront each other in the front-rear direction 8. As a result, the shaft 68 of the spur roller 46 is disposed between the front side projections 81A and the rear side projections 81B in the front-rear direction 8.

Further, as illustrated in FIGS. 4A, 4B and FIGS. 5A, 5B, at least one projection 82 as an example of an engaging portion projects from an upper surface of the abutment member 75. The projection 82 is inserted through a guide slit 83 as an example of an engaged portion formed in the slide portion 74 (described later) to be engaged with the guide slit 83. As described later, when the slide portion 74 is moved in the left-right direction 9, the projection 82 is moved along the guide slit 83. This causes the abutment member 75 to be moved in the front-rear direction 8.

When the projection 82 is situated at a left end portion of the guide slit 83 (see FIG. 6A), that is, when the abutment member 75 is situated on the frontmost side within its movable range in the front-rear direction 8 (see FIGS. 6D and 6G), the abutment member 75 is situated at a third position. On the other hand, when the projection 82 is situated at a right end portion of the guide slit 83 (see FIG. 6C), that is, when the abutment member 75 is situated on the rearmost side within its movable range in the front-rear direction 8 (see FIGS. 6F and 6I), the abutment member 75 is situated at a fourth position. The fourth position is upstream of the third position in the conveying direction 16.

A protruding end of the projection 81, that is, a lower end of the projection 81 abuts against the bottom plate 72A of the guide member 72. Thus, the abutment member 75 is supported by the guide member 72 so as to be movable to the third and fourth positions.

[Slide Portion 74]

As illustrated in FIGS. 4A and 4B, the slide portion 74 is a plate-like member elongated in the left-right direction 9. In the present embodiment, the slide portion 74 is supported by the guide member 72 so as to be movable in the left-right direction 9.

A protrusion 79 protrudes downward from a lower surface 74A of the slide portion 74. The protrusion 79 has a first abutment surface 79A and a second abutment surface 79B. The first abutment surface 79A is inclined diagonally below and rightward from the lower surface 74A of the slide member 74. The second abutment surface 79B is formed continuously from the first abutment surface 79A and positioned below the first abutment surface 79A.

In a state where the upper end portion of the shaft pressing portion 73 abuts against the lower surface 74A of the slide portion 74 (in a state where the slide portion 74 is situated at a position illustrated in FIG. 4A), the lower surface 74A abuts against the upper end portion of the shaft pressing portion 73 from above to press downward the shaft pressing portion 73, causing the lower end portion of the shaft pressing portion 73 to press downward the shaft 68 of the spur roller 46. As a result, the spur roller 46 presses the inversion roller 45. The position of the slide portion 74 illustrated in FIG. 4A is a fifth position.

When the slide portion 74 is moved leftward from the position illustrated in FIG. 4A, the slide portion 74 is situated at a position illustrated in FIG. 4B. In the course of this movement, initially the first abutment surface 79A of the protrusion 79 moving leftward abuts against the upper end portion of the shaft pressing portion 73. The further leftward movement of the slide portion 74 causes the upper end portion of the shaft pressing portion 73 to be further pressed by the first abutment surface 79A as a sloped surface. Finally, as illustrated in FIG. 4B, the second abutment surface 79B of the protrusion 79 abuts against the upper end portion of the shaft pressing portion 73.

In a state where the upper end portion of the shaft pressing portion 73 abuts against the second abutment surface 79B of the protrusion 79 (in a state where the slide portion 74 is situated at a position illustrated in FIG. 4B), the protrusion 79 abuts against the upper end portion of the shaft pressing portion 73 from above to press downward the shaft pressing portion 73. The second abutment surface 79B of the protrusion 79 is positioned below the lower surface 74A of the slide portion 74. Thus, the downward pressing force of the protrusion 79 against the shaft pressing portion 73 is greater than the downward pressing force of the lower surface 74A of the slide portion 74 against the shaft pressing portion 73. The position of the slide portion 74 illustrated in FIG. 4B is a sixth position.

In the present embodiment, the sixth position is positioned on the left side relative to the fifth position. However, the sixth position may be positioned on the right side relative to the fifth position, provided that the spur movement mechanism 64 is configured such that the following operation of the spur movement mechanism 64 can be achieved.

As described above, the slide member 74 is provided so as to be movable in the left-right direction 9 to the fifth position and to the sixth position.

The guide slit 83 as illustrated in FIG. 6A is formed in the slide portion 74. In a state where the slide portion 74 and the abutment member 75 are assembled, the guide slit 83 is disposed at a position confronting the projection 82 of the abutment member 75. The guide slit 83 receives insertion of the projection 82. As described later, when the slide portion 74 is moved in the left-right direction 9, the projection 82 is pressed by an edge of the guide slit 83 of the slide portion 74 to be moved. That is, the slide portion 74 is provided so as to be abuttable against the abutment member 75.

The guide slit 83 includes a first guide portion 84, a second guide portion 85, and a third guide portion 86. The first guide portion 84 extends in the left-right direction 9. The second guide portion 85 is positioned on the upstream side in the conveying direction 16, that is, the rear side, relative to the first guide portion 84 and extends in the left-right direction 9. The third guide portion 86 connects the first and second guide portions 85 and 86.

When the slide portion 74 is situated at the fifth position, the projection 82 of the abutment member 75 is inserted through the first guide portion 84, as illustrated in FIG. 6A. On the other hand, when the slide portion 74 is situated at the sixth position, the projection 82 of the abutment member 75 is inserted through the second guide portion 85, as illustrated in FIG. 6C.

The third guide portion 86 extends diagonally downstream in the conveying direction 16 from rear right to front left. The guide slit 83 may be formed to extend in a direction other than the above, provided that the spur movement mechanism 64 is configured such that the following operation of the spur movement mechanism 64 can be achieved.

[Coil Spring 90]

As illustrated in FIGS. 3A and 3B, a coil spring 90 as an example of an urging member is provided at a left end portion of the slide portion 74. The coil spring 90 is adapted to urge the slide portion 74 from the sixth position to the fifth position, that is, to the right. In the present embodiment, a right end portion of the coil spring 90 is fixed to the slide portion 74, and a left end portion thereof is fixed to the main frame (not illustrated) of the printer section 11.

A protrusion 97 is provided at a rear left end portion of the slide portion 74 and extends upward therefrom. A right surface of the protrusion 97 abuts against a front portion 23A (downstream end portion in the conveying direction 16) of the carriage 23 that is moved in the left-right direction 9. When the carriage 23 is moved to the left to abut against the protrusion 97 to thereby press the protrusion 97 to the left, the coil spring 90 is compressed, with the result that the slide portion 74 is moved to the left, that is, from the fifth position to the sixth position against the urging force of the coil spring 90. Hence, the slide portion 74 abuts against the carriage 23 that is moved in the left-right direction 9 and is thereby moved from the fifth position to the sixth position against the urging force of the coil spring 90.

When the carriage 23 that is pressing the slide portion 74 is moved to the right, the slide portion 74 is moved to the right, that is, from the sixth position to the fifth position by receiving the urging force of the coil spring 90 (i.e. a force of the coil spring 90 for restoring the coil spring 90 from the compressed state to the original state).

In the present embodiment, the slide portion 74 is moved to the left by being pressed by the carriage 23 and moved to the right by receiving the urging force of the coil spring 90. Alternatively, however, the slide portion 74 may be moved by another mechanism. For example, the slide portion 74 may be moved in the left-right direction 9 by receiving a driving force from a dedicated motor.

[Operation of Spur Movement Mechanism 64]

In a state where the carriage 23 does not abut against the protrusion 97 (see FIG. 3), the slide portion 74 is situated at the fifth position illustrated in FIGS. 4A and 6A. Further, in the above state, as illustrated in FIG. 6D, the abutment member 75 is situated at the third position. At this time, the projection 82 of the abutment member 75 is inserted through the guide slit 83 in the first guide portion 84. At the same time, the rear side projections 81B of the abutment member 75 abut against the shaft 68 of the spur roller 46 from the upstream side in the conveying direction 16 to press the shaft 68 to the downstream side in the conveying direction 16. This causes the shaft 68 of the spur roller 46 to be situated at the front end portion of the front-rear slit 71, that is, at the first position. As a result, the position of the spur roller 46 with respect to the inversion roller 45 is as illustrated in FIG. 6G. Further, at this time, the shaft pressing portion 73 abuts against the lower surface 74A of the slide portion 74 as illustrated in FIG. 4A to thereby press the shaft 68 of the spur roller 46 downward. Consequently, the spur roller 46 is brought into pressure contact with the inverse roller 45.

When the carriage 23 is moved to the left to press the protrusion 97 of the slide portion 74, the slide portion 74 is moved to the left, that is, from the fifth position to the sixth position. Then, the projection 82 of the abutment member 75 is guided from the first guide portion 84 (see FIG. 6A) to the second guide portion 85 (see FIG. 6C) through the third guide portion 86 (see FIG. 6B).

When the slide portion 74 is moved from the fifth position to the sixth position, the abutment member 75 is moved to the upstream side in the conveying direction 16, that is, from the third position to the fourth position. In the course of the movement of the abutment member 75 from the third position to the fourth position, the front side projections 81A abut against the shaft 68 of the spur roller 46 from the downstream side in the conveying direction 16 to press the shaft 68 to the upstream side in the conveying direction 16. As a result, the spur roller 46 is moved to the upstream side in the conveying direction 16, that is, from the first position to the second position. More specifically, the spur roller 46 shifts from the state illustrated in FIGS. 6D and 6G to the state illustrated in FIGS. 6F and 6I through the state illustrated in FIGS. 6E and 6H.

When the slide portion 74 is moved from the fifth position to the sixth position, the upper end portion of the shaft pressing portion 73 shifts from the state of abutting against the lower surface 74A of the slide portion 74 to the state of abutting against the second abutment surface 79B through the state of abutting against the first abutment surface 79A. The shaft pressing portion 73 abuts against the second abutment surface 79B as illustrated in FIG. 4B to thereby press downward the shaft 68 of the spur roller 46 with a force stronger than that in the state illustrated in FIG. 4A.

Hence, in the present embodiment, when the slide portion 74 is moved from the fifth position to the sixth position, each spur roller 46 is moved from the first position to the second position. In this state, the spur roller 46 at the second position is away from an axial center of the inversion roller 45 in the front-rear direction 8 farther than the spur roller 46 at the first position is away from an axial center of the inversion roller 45 in the front-rear direction 8. However, in the present embodiment, when the spur roller 46 is moved from the first position to the second position, the pressing force of the spur roller 46 against the inversion roller 45 is increased by the shaft pressing portions 73, thereby maintaining the pressing force of the spur roller 46 against the inversion roller 45.

When the carriage 23 is moved to the right in the state where the slide portion 74 is situated at the sixth position, the slide portion 74 is moved to the right, that is, from the sixth position to the fifth position, by the urging force of the coil spring 90. Then, the projection 82 of the abutment member 75 is guided from the second guide portion 85 (see FIG. 6C) to first guide portion 84 (see FIG. 6A) through the third guide portion 86 (see FIG. 6B).

When the slide portion 74 is moved from the sixth position to the fifth position, the abutment member 75 is moved to the downstream side in the conveying direction 16, that is, from the fourth position to the third position. In the course of the movement of the abutment member 75 from the fourth position to the third position, the rear side projections 81B abut against the shaft 68 of the spur roller 46 from the upstream side in the conveying direction 16 to press the shaft 68 to the downstream side in the conveying direction 16. As a result, the spur roller 46 is moved to the downstream side in the conveying direction 16, that is, from the second position to the first position.

When the slide portion 74 is moved from the sixth portion to the fifth portion, the upper end portion of the shaft pressing portion 73 is moved from the second abutment surface 79B to the lower surface 74A of the slide portion 74 through the first abutment surface 79A to abut against the lower surface 74A.

[Sheet Position Determination Section]

The multifunction machine 10 includes a sheet position determination section that is configured to identify a position of the recording sheet 12 along the first conveying path 65, that is, a position of the recording sheet 12 conveyed in the conveying direction 16. In the present embodiment, the sheet position determination section includes a sensor 160 and a rotary encoder 153.

As illustrated in FIG. 2, the sensor 160 is provided in the first conveying path 65 on the upstream side relative to the conveying roller 60 in the conveying direction 16 and on the downstream side relative to the second junction 37 in the conveying direction 16. The position at which the sensor 160 is to be provided is not limited to this, but the sensor 160 may be provided at any position in the first conveying path 65 other than the above position or may be provided in the second conveying path 67. Further, the number of the sensors to be provided in the printer section 11 is not limited to one, and two or more sensors 160 may be provided in the printer section 11.

In the present embodiment, the sensor 160 includes a shaft 161, a detector 162 capable of pivotally moving about the shaft 161, and an optical sensor 163. The optical sensor 163 has a light-emitting element, and a light receiving element that receives light emitted from the light-emitting element. One end of the detector 162 protrudes to the first conveying path 65. When no external force is applied to the one end of the detector 162, the other end of the detector 162 enters a light path of the optical sensor 163 from the light-emitting element to the light receiving element to block light passing through the light path. At this time, a low level signal is outputted from the optical sensor 163 to a controller 130 (described later). When a leading end of the recording sheet 12 presses the one end of the detector 162 to pivotally move the detector 162, the other end of the detector 162 is moved away from the light path, with the result that light passes through the light path. At this time, a high level signal is outputted from the optical sensor 163 to the controller 130 (described later). With this configuration, the sensor 160 detects an upstream end of the recording sheet 12 and a downstream end of the recording sheet 12 in the conveying direction 16.

The rotary encoder 153 is provided at the conveying roller 60. When the conveying roller 60 is rotated, the rotary encoder 153 generates a pulse signal. The rotary encoder 153 may be provided at a roller other than the conveying roller 60, for example, the discharge roller 62.

The rotary encoder 153 includes an encoder disk 154 fixed to a shaft 34 of the conveying roller 60 and rotated together with the conveying roller 60, and an optical sensor 152. The encoder disk 154 has a light transmitting portion through which light is transmitted and a light shielding portion through which light is blocked. The light transmitting portion and the light shielding portion are alternately arranged with regular pitch along a circumferential direction of the encoder disk 154. When the encoder disk 154 is rotated, the pulse signal is generated every time the light transmitting portion and the light shielding portion are detected by the optical sensor 152. The generated pulse signal is outputted to the controller 130. With the above configuration, the rotary encoder 153 detects a rotation amount of the conveying roller 60.

The controller 130 identifies the position of the conveyed recording sheet 12 based on the signals outputted from the sensor 160 and the rotary encoder 153. For example, in the present embodiment, the controller 130 identifies a current position of the downstream end of the recording sheet 12 in the conveying direction 16 based on the rotation amount of the conveying roller 60 after a detection timing of the downstream end of the recording sheet 12 in the conveying direction 16 by the sensor 160. Further, the controller 130 identifies a current position of the upstream end of the recording sheet 12 in the conveying direction 16 based on the rotation amount of the conveying roller 60 after a detection timing of the upstream end of the recording sheet 12 in the conveying direction 16 by the sensor 160. Thus, the function of the sheet position determination section is realized by the sensor 160, the rotary encoder 153, and the controller 130.

The configuration of the sheet position determination section is not limited to that described above as long as the sheet position determination section can identify the position of the conveyed recording sheet 12 in the conveying direction 16. For example, the sheet position determination section may be configured to identify the position of the conveyed recording sheet 12 based on an elapsed time from start of the feeding of the recording sheet 12 from the feed tray 20.

[Controller 130]

Figure 7:
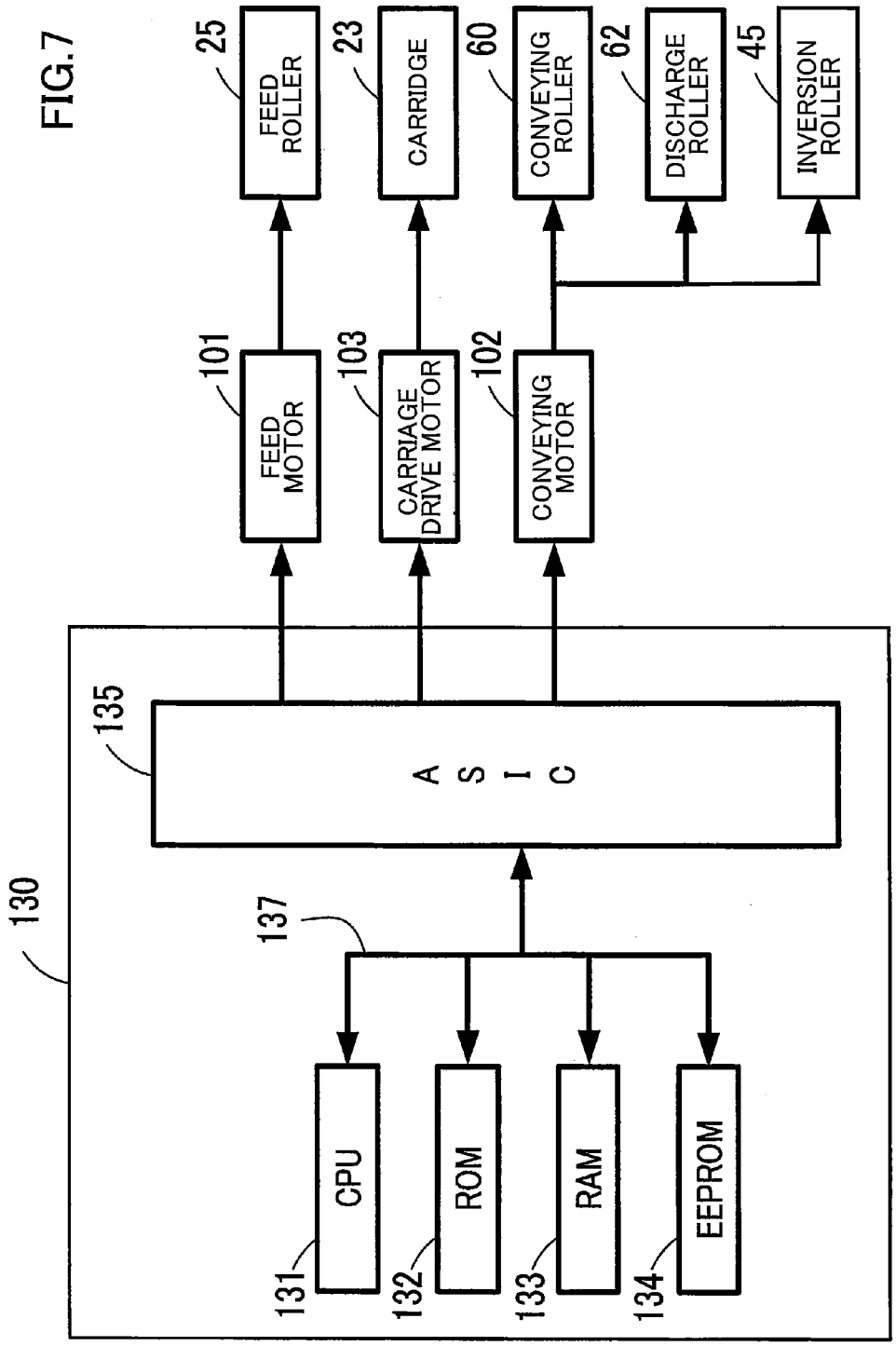
FIG. 7 is a block diagram illustrating a configuration of a controller provided in the multifunction machine according to the embodiment.

A configuration of the controller 130 will be described with reference to FIG. 7. The present invention is realized by the controller 130 performing recording control according to a flowchart to be described later. The controller 130 is configured to control the entire operation of the multifunction machine 10. The controller 130 includes a CPU 131, a ROM 132, a RAM 133, an EEPROM 134, an ASIC 135, and an internal bus 137 connecting the above components.

The ROM 132 stores therein a program for the CPU 131 to control various operations including the recording control. The RAM 133 is used as a storage area for temporarily storing data and a signal which CPU 131 uses for execution of the above program. The EEPROM 134 stores therein a setting and a flag to be retained therein even after power-off.

The ASIC 135 is connected with the conveying motor 102, the feed motor 101, and the carriage drive motor 103. The ASIC 135 has drive circuits, mounted therein, for controlling the above motors. When a drive signal for rotating one of the motors is inputted by the CPU 131 to a drive circuit corresponding to the motor, drive current according to the drive signal is outputted from the drive circuit to the corresponding motor. As a result, the corresponding motor is rotated. That is, the controller 130 is configured to control the motors 101, 102, and 103.

The pulse signal outputted from the optical sensor 152 of the rotary encoder 153 is inputted to the ASIC 135. As described above, the controller 130 identifies the position of the upstream and downstream ends of the conveyed recording sheet 12 in the conveying direction 16 based on the rotation amount of the conveying roller 60 and the detection timing of the upstream and downstream ends of the recording sheet 12 in the conveying direction 16 at the mounting position of the sensor 160.

[Image Recording Control]

Hereinafter, a procedure in which the controller 130 executes a double-sided image recording operation for the recording sheet 12 will be described based on a flowchart of FIG. 8A. The present invention is realized by execution of the double-sided image recording operation according to an instruction of the controller 130. Note that an initial position of the slide portion 74 is assumed to be the fifth position.

When a double-sided printing operation is instructed by operating the operation panel 22 (see FIG. 1), the controller 130 drives the feed motor 101. This rotates the feed roller 25, causing the recording sheet 12 placed on the feed tray 20 to be fed to the first conveying path 65 (S10). Subsequently, the controller 130 performs normal rotation drive of the conveying motor 102. This rotates the conveying roller 60, the discharge roller 62, and the inversion roller 45 in the second rotation direction, and the recording sheet 12 that has reached the conveying roller pair 54 is conveyed in the conveying direction 16 by the conveying roller pair 54 (S20).

When the leading end of the recording sheet 12 conveyed in the conveying direction 16 reaches a position confronting the recording section 24, the controller 130 stops the conveying motor 102 to stop conveyance of the recording sheet 12 and then executes image recording to record an image onto a first surface of the recording sheet 12 (S30). The image recording is realized by alternate execution of conveyance of the recording sheet 12 by a predetermined linefeed width and ejection of ink droplets by the recording section 24.

After completion of the image recording onto the first surface, the controller 130 performs normal rotation drive of the conveying motor 102. This rotates the conveying roller 60, the discharge roller 62, and the inversion roller 45 in the second rotation direction, causing the recording sheet 12 to be conveyed in the conveying direction 16. When determining that the rear end (trailing end) of the recording sheet 12 conveyed in the conveying direction 16 reaches a prescribed position, that is, the first junction 36, the controller 130 stops the conveying motor 102 (S40).

Subsequently, the controller 130 moves the carriage 23 to the left to move the slide portion 74 from the fifth position to the sixth position (S50). The movement of the slide portion 74 to the sixth position moves the abutment member 75 from the third position to the fourth position. The movement of the abutment member 75 from the third position to the fourth position moves each spur roller 46 from the first position to the second position. This changes a positional relationship between the spur roller 46 and the inversion roller 45 from a relationship illustrated in FIG. 6D to that illustrated in FIG. 6F. As a result, the rear end of the recording sheet 12 nipped by the inversion roller pair 43 is directed toward the second conveying path 67.

Hence, the controller 130 moves the carriage 23 to move the slide portion 74 to the sixth position on the condition that the rear end (trailing end) of the recording sheet 12 conveyed on the first conveying path 65 in the conveying direction 16 is situated at the first junction 36 where the first conveying path 65 merges with the second conveying path 67.

Subsequently, the controller 130 performs reverse rotation drive of the conveying motor 102 (S60). This rotates the conveying roller 60, the discharge roller 62, and the inversion roller 45 in the first rotation direction, causing the conveying direction of the recording sheet 12 to be a direction opposite to the conveying direction 16. Accordingly, the recording sheet 12 whose upstream end in the conveying direction 16 is directed to the second conveying path 67 is conveyed to the second conveying path 67 in a switch-back manner. The switch-back conveyed recording sheet 12 is conveyed on the second conveying path 67 from the first junction 36 toward the second junction 37.

Hence, the inversion roller pair 43 nips the recording sheet 12 to convey the recording sheet 12 to the downstream side in the conveying direction 16 when the inversion roller 45 is rotated in the second rotation direction, and to convey the recording sheet 12 to the second conveying path 67 when the inversion roller 45 is rotated in the first rotation direction.

After the recording sheet 12 is guided to the second conveying path 67 and before the leading end of the recording sheet 12 conveyed in a switch-back manner from the second junction 37 to the first conveying path 65 again reaches the position confronting the recording section 24, the controller 130 moves the carriage 23 to the right to thereby move the slide portion 74 from the sixth position to fifth position (S70). The movement of the slide portion 74 to the fifth position moves the abutment member 75 from the fourth position to the third position. The movement of the abutment member 75 from the fourth position to the third position moves each spur roller 46 from the second position to the first position. When the leading end of the recording sheet 12 conveyed in a switch-back manner from the second junction 37 to the first conveying path 65 reaches the conveying roller pair 54, the controller 130 performs normal rotation drive of the conveying motor 102 to rotate the conveying roller 60, the discharger roller 62, and the inversion roller 45 in the second rotation direction. As a result, the leading end of the recording sheet 12 is conveyed to the position confronting the recording section 24. Accordingly, a second surface (i.e. a surface opposite to the first surface) of the recording sheet 12 confronts the recording head 39.

Thereafter, the controller 130 executes image recording to record an image onto the second surface of the recording sheet 12 (S80). After completion of the image recording onto the second surface, the controller 130 performs normal rotation drive of the conveying motor 102. This rotates the conveying roller 60, the discharger roller 62, and the inversion roller 45 in the second rotation direction, causing the recording sheet 12 to be conveyed in the conveying direction 16. As a result, the recording sheet 12 is conveyed from the recording section 24 and discharged to the discharge tray 21 through the discharge roller pair 55 and the inversion roller pair 43 (S90).

[Effects of Embodiment]

According to the above-described embodiment, the movement of the slide portion 74 from the fifth position to the sixth position in the left-right direction 9 allows each spur roller 46 and the abutment member 75 to be moved in the conveying direction 16. That is, the moving direction of the slide portion 74 is different from the moving direction of the spur roller 46 and the abutment member 75. This eliminates the necessity to arrange the slide portion 74 to be juxtaposed with the spur roller 46 and the abutment member 75 along the conveying direction 16. Thus, according to the above-described embodiment, the spur roller 46 can be moved inside the multifunction machine 10.

Further, according to the above-described embodiment, the functions of the abutment member 75 and the slide portion 74 can simply be realized by the projection 82 of the abutment member 75 and the guide slit 83 of the slide portion 74.

Further, according to the above-described embodiment, even when the spur roller 46 is moved along the front-rear slit 71 extending in the conveying direction 16, a state where the spur roller 46 is in pressure contact with the inversion roller 45 can be maintained by the urging force of the spring constituting the shaft 68 of the spur roller 46.

Further, the second conveying path 67 is a path branching from the first conveying path 65. Accordingly, the sheet nipping angle at which the recording sheet 12 conveyed on the second conveying path 67 is nipped by the inversion roller pair 43 differs from the sheet nipping angle at which the recording sheet 12 conveyed on the first conveying path 65 is nipped by the inversion roller pair 43. In other words, the tangent line passing through the nip point where the recording sheet 12 conveyed on the second conveying path 67 is nipped by the inversion roller pair 43 is angled with respect to the tangent line passing through the nip point where the recording sheet 12 conveyed on the first conveying path 65 is nipped by the inversion roller pair 43. Thus, in the above-described embodiment, when the rear end (trailing end) of the recording sheet 12 conveyed in the conveying direction 16 is situated at the first junction 36, that is, when the recording sheet 12 is conveyed toward the second conveying path 67, the slide portion 74 is moved to the sixth position to move each spur roller 46 from the first position to the second position. This changes the sheet nipping angle at which the recording sheet 12 is nipped between the spur roller 46 and the inversion roller 45, that is, changes the inclination of the tangent line. As a result, the recording sheet 12 can be conveyed toward the second conveying path 67.

Further, according to the above-described embodiment, the slide portion 74 can be moved by moving the carriage 23. This eliminates the necessity to additionally provide a dedicated drive source for moving the slide portion 74.

Further, according to the above-described embodiment, the spur rollers 46 are covered by the bottom plate 72A and the side plates standing upward from the left and right end portions of the bottom plate 72A. This protects the spur rollers 46 from being touched from outside by a user, thereby reducing a possibility that the spur rollers 46 are damaged.

[First Modification]

The conveying device of the multifunction machine 10 according to a first modification of the present invention will be described while referring to FIGS. 8B through 10I. In the following description, only parts differing from those of the above-described embodiment will be described.

Figure 9A:
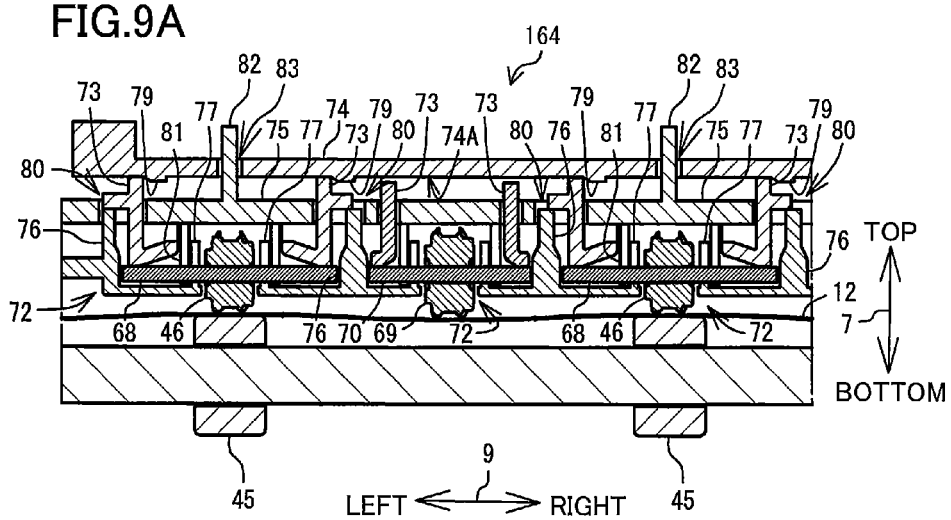
FIG. 9A is a partial cross-sectional view illustrating a part of a spur movement mechanism provided in the multifunction machine according to the first modification.

The conveying device according to the first modification is configured to convey the recording sheet 12 in a waved state in the left-right direction 9. In this case, for example, as illustrated in FIG. 9A, the conveying device further includes a pressing spur roller 69 as an example of a third roller provided between two neighboring spur rollers 46 arrayed in the left-right direction 9. Similar to the above-described embodiment, eight spur rollers 46 are provided in the first modification, as illustrated in FIG. 3B, so that the number of the pressing spur rollers 69 is seven. A shaft 70 extends through each pressing spur roller 69 in the similar manner to the spur roller 46 through which the shaft 68 extends.

The pressing spur roller 69 has a diameter greater than that of the spur roller 46. Accordingly, a lower end of the pressing spur roller 69 is positioned below the lower end of the spur roller 46. That is, the pressing spur roller 69 is positioned on the inversion roller 45 side in the upper-lower direction 7 further than the spur roller 46 is positioned. In other words, the pressing spur roller 69 is positioned closer to an axial center of the inversion roller 45 in the upper-lower direction 7 than the spur roller 46 to the axial center. Thus, as illustrated in FIG. 9A, in a state of being nipped by the inversion roller pair 43, the recording sheet 12 conveyed on the first conveying path 65 is pressed down by the pressing spur roller 69 to a position lower than the lower end of the spur roller 46, thereby forming the recording sheet 12 into a wave-shape running in the left-right direction 9.

In the above-described embodiment, the slide portion 74 is moved to the left by being pressed by the carriage 23 and moved to the right by the urging force of the coil spring 90. On the other hand, in the first modification, the slide portion 74 of a spur movement mechanism 164 may be moved in the left-right direction 9 by receiving a drive force from a dedicated motor (not illustrated, as an example of a drive unit). As a matter of course, also in the first modification, the slide portion 74 may be moved in the left-right direction 9 by the same mechanism as that of the above-described embodiment.

If a condition is met, in which the sheet nipping angle at which the recording sheet 12 is nipped by the inversion roller pair 43 when the spur roller 46 is situated at the second position is greater than the sheet nipping angle at which the recording sheet 12 is nipped by the inversion roller pair 43 when the spur roller 46 is situated at the first position, the recording sheet 12 nipped by the inversion roller pair 43 when the spur roller 46 is situated at the second position may be inclined downward toward the rear side or may be inclined upward toward the rear side.

Figure 9B:
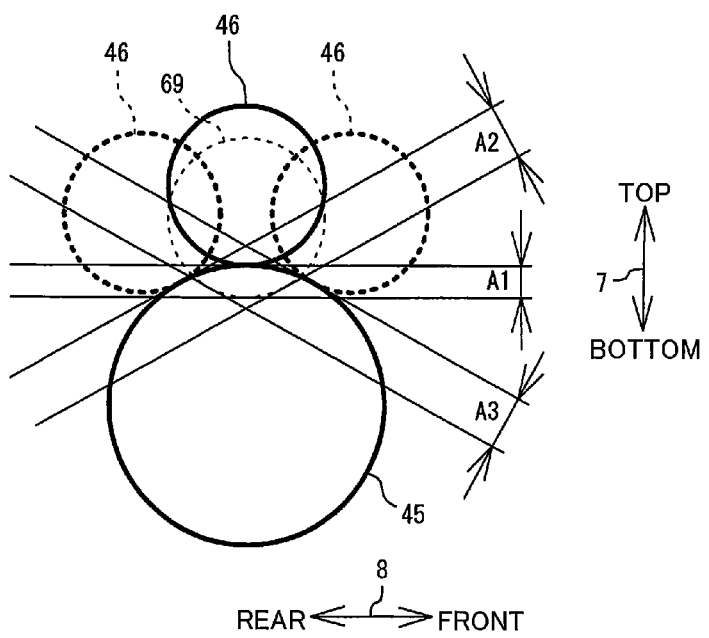
FIG. 9B is a schematic view illustrating an inversion roller pair for explaining an amplitude of a wave-shape of a recording sheet in the multifunction machine according to the first modification.

This is because the first modification aims to make an amplitude of the wave-shape of the recording sheet 12 when the spur roller 46 is situated at the second position greater than an amplitude of the wave-shape when the spur roller 46 is situated at the first position. As illustrated in FIG. 9B, the amplitude of the wave-shape is irrelevant to the inclination direction of the recording sheet 12, and the greater the sheet nipping angle, the greater the amplitude becomes. Specifically, amplitudes A2 and A3 when the spur roller 46 is situated at the second position are greater than an amplitude A1 when the spur roller 46 is situated at the first position.

As illustrated in FIGS. 10A through 10I, the operations of the slide portion 74, the abutment member 75, and the spur roller 46 are the same as those in the above-described embodiment excluding the presence of the pressing spur roller 69. That is, FIGS. 10A to 10I correspond to FIGS. 6A to 6I, respectively.

Hereinafter, a procedure in which the controller 130 executes a single-sided image recording operation for the recording sheet 12 will be described based on a flowchart of FIG. 8B. The present invention is realized by execution of the single-sided image recording operation according to an instruction of the controller 130.

Note that an initial position of the slide portion 74 is assumed to be the fifth position. In the following description, only different steps from those in the flowchart of FIG. 8A in the above-described embodiment will be described in detail, and other steps will be simplified or omitted.

When the leading end of the recording sheet 12 conveyed in the conveying direction 16 reaches the position confronting the recording section 24, the controller 130 stops the conveying motor 102 to stop conveyance of the recording sheet 12 and then executes image recording to record an image onto either surface of the recording sheet 12 as in the above-described embodiment (S200).

After completion of the image recording onto the surface, the controller 130 performs normal rotation drive of the conveying motor 102. This rotates the conveying roller 60, the discharge roller 62, and the inversion roller 45 in the second rotation direction, causing the recording sheet 12 to be conveyed in the conveying direction 16. When determining that the leading end of the recording sheet 12 conveyed in the conveying direction 16 passes through the sheet nipping position by the inversion roller pair 43, the controller 130 stops the conveying motor 102 (S210).

Subsequently, the controller 130 drives the dedicated motor to move the slide portion 74 from the fifth position to the sixth position (S220). The movement of the slide portion 74 to the sixth position moves the abutment member 75 from the third position to the fourth position. The movement of the abutment member 75 from the third position to the fourth position moves each spur roller 46 from the first position to the second position. This changes a positional relationship between the spur roller 46 and the inversion roller 45 from a relationship illustrated in FIG. 10D to that illustrated in FIG. 10F. As a result, the inclination angle of the recording sheet 12 nipped by the inversion roller pair 43 in a state illustrated in FIG. 10F becomes greater than the inclination angle in a state illustrated in FIG. 10D.

Hence, the controller 130 drives the dedicated motor to move the slide portion 74 to the sixth position on the condition that the leading end of the recording sheet 12 conveyed on the first conveying path 65 in the conveying direction 16 passes through the sheet nipping position by the inversion roller pair 43.

Subsequently, the controller 130 performs normal rotation drive of the conveying motor 102 to convey the recording sheet 12 in the conveying direction 16. As a result, the recording sheet 12 is discharged to the discharge tray 21 (S90). In step S90, when determining that the rear end (trailing end) of the recording sheet 12 conveyed in the conveying direction 16 passes through the sheet nipping position by the inversion roller pair 43, the controller 130 stops the conveying motor 102, and drives the dedicated motor to move the slide portion 74 from the sixth position to the fifth position (S230).

Although the above description has been given of the single-sided image recording, the steps S210, S220 and S230 are executed in the same manner in the case of the double-sided image recording. That is, in the double-sided image recording, steps S210, S220, S230 are executed after the image recording of the second surface of the recording sheet 12.

According to the first modification, the recording sheet 12 nipped between the spur roller 46 and the inversion roller 45 is pressed by the pressing spur roller 69 provided between the neighboring spur rollers 46 arrayed in the left-right direction 9 to be formed into a wave-shape running in the left-right direction 9. Further, according to the first modification, when the spur roller 46 is moved in the conveying direction 16, the amplitude of the wave-shape of the recording sheet 12 running in the left-right direction 9 varies. That is, according to the first modification, the amplitude of the wave-shape of the recording sheet 12 running in the left-right direction 9 can be made variable. The greater the amplitude of the wave-shape of the recording sheet 12, the higher rigidity of the recording sheet 12 is. That is, according to the first modification, the rigidity of the recording sheet 12 can be made variable.

If the recording sheet 12 being discharged outside of the multifunction machine 10 is bent such that the leading end of the recording sheet 12 hangs down around the opening 13 of the multifunction machine 10 in which the conveying device is mounted, the recording sheet 12 may be caught on the multifunction machine 10. Therefore, the recording sheet 12 to be discharged is preferably suppressed from being bent until the trailing end of the recording sheet 12 is away from the inversion roller pair 43. Thus, in the first modification, when the recording sheet 12 is discharged, the slide portion 74 is moved to the sixth position to move the spur roller 46 to the second position. In the first modification, the sheet nipping angle when the spur roller 46 is situated at the second position is greater than the sheet nipping angle when the spur roller 46 is situated at the first position. In other words, the angle, with respect to the horizontal direction, defined by the tangent line passing through the nip point between the spur roller 46 situated at the second position and the inversion roller 45 is greater than the angle, with respect to the horizontal direction, defined by the tangent line passing through the nip point between the spur roller 46 situated at the first position and the inversion roller 45. This increases the rigidity of the recording sheet 12 nipped between the spur roller 46 and the inversion roller 45. As a result, the bending of the recording sheet 12 to be discharged outside of the multifunction machine 10 can be made less likely to occur, thereby reducing a possibility that the recording sheet 12 is caught on the multifunction machine 10 in which the conveying device is mounted.

[Second Modification]

Processing of the flowchart of FIG. 8B described in the first modification may be executed in a configuration in which the pressing spur roller 69 is not provided. In the configuration in which the pressing spur roller 69 is not provided and the recording sheet 12 is not formed into a wave-shape running in the left-right direction 9, each spur roller 46 is moved to the second position to make the sheet nipping angle greater when the recording sheet 12 is discharged, whereby suppressing the recording sheet 12 from being bent. In this case, stackability of the plurality of recording sheets 12 discharged to the discharge tray 21 can be enhanced.

[Third Modification]

A spur movement mechanism 264 of the multifunction machine 10 according to a third modification of the present invention will be described while referring to FIG. 5C. In the following description, only parts differing from those of the above-described embodiment will be described.

In the above-described embodiment, as illustrated in FIGS. 5A and 5B, the front-rear slit 71 linearly extends in the front-rear direction 8. Alternatively, however, a front-rear slit 271 of a guide member 272 may extend in the front-rear direction 8 in a curved manner, as illustrated in FIG. 5C. Specifically, the front-rear slit 271 according to the third modification is curved downward toward the rear side. That is, the front-rear slit 271 according to the third modification is curved toward the inversion roller 45 side in the conveying direction 16.

Also in the third modification, the spur roller 46 is guided to the first and second positions by the movement of the shaft 68 pressed by the abutment member 75 along the front-rear slit 271, as in the above-described embodiment.

In the above-described embodiment, when the slide portion 74 is moved from the fifth position to the sixth position, that is, when the spur roller 46 is moved from the first position to the second position, the pressing force of the shaft pressing portions 73 against the shaft 68 is increased to increase the pressing force of the spur roller 46 against the inversion roller 45, thereby maintaining the pressing force of the spur roller 46 against the inversion roller 45.

On the other hand, in the third modification, when the spur roller 46 is moved from the first position to the second position, the spur roller 46 is moved along the curved front-rear slit 271 to be moved close to the inversion roller 45, thereby maintaining the pressing force of the spur roller 46 against the inversion roller 45. Accordingly, in the third modification, the spur movement mechanism 264 needs not be provided with a mechanism for varying the pressing force of the slide portion 74 against the shaft pressing portion 73, that is, the pressing force of the shaft pressing portion 73 against the inversion roller 45, depending on the position (fifth position, sixth position) of the slide portion 74.

According to the third modification, even when the spur roller 46 is moved away from the inversion roller 45 in the conveying direction 16, the curved front-rear slit 271 brings the spur roller 46 close to the inversion roller 45, thereby maintaining a state where the spur roller 46 is in pressure contact with the inversion roller 45.

While the present invention has been described in detail with reference to the embodiment thereof, it would be apparent to those skilled in the art that various changes and modifications may be made therein without departing from the spirit of the present invention.

What is claimed is:

1. A conveying device configured to convey a recording sheet in a conveying direction, the conveying device comprising:
   a plurality of first rollers arrayed at intervals in an arrayed direction perpendicular to the conveying direction, each of the plurality of first rollers having a shaft extending in the arrayed direction;
   a plurality of second rollers provided in one-to-one correspondence with the plurality of first rollers, each of the plurality of second rollers being in pressure contact with the corresponding first roller and being configured to convey the recording sheet in the conveying direction while nipping the recording sheet with the corresponding first roller at a nip point; and
   a roller holder configured to support the plurality of first rollers such that the plurality of first rollers is movable along the conveying direction between a first position and a second position, each of the plurality of first rollers in the first position and the corresponding second roller defining a first tangent line passing through the nip point, each of the plurality of first rollers in the second position and the corresponding second roller defining a second tangent line passing through the nip point, the second tangent line being angled with respect to the first tangent line, the roller holder comprising:
      a roller accommodating portion configured to accommodate the plurality of first rollers therein;
      an abutment member supported by the roller accommodating portion so as to be movable along the conveying direction between a third position and a fourth position, the abutment member being configured to abut against each of the shafts of the plurality of first rollers to move each of the plurality of first rollers from the first position to the second position in response to the movement of the abutment member from the third position to the fourth position, the abutment member being further configured to abut against each of the shafts of the plurality of first rollers to move each of the plurality of first rollers from the second position to the first position in response to the movement of the abutment member from the fourth position to the third position; and a slide portion configured to abut against the abutment member, the slide portion being supported by the roller accommodating portion so as to be movable along the arrayed direction between a fifth position and a sixth position, the slide portion being configured to be moved from the fifth position to the sixth position to move the abutment member from the third position to the fourth position, the slide portion being further configured to be moved from the sixth position to the fifth position to move the abutment member from the fourth position to the third position.

2. The conveying device as claimed in claim 1, wherein the abutment member includes a plurality of first abutment portions each disposed on a first side of the shaft of the corresponding first roller in the conveying direction, and a plurality of second abutment portions each disposed on a second side of the shaft of the corresponding first roller in the conveying direction, the second side being opposite to the first side in the conveying direction.

3. The conveying device as claimed in claim 1, further comprising a plurality of third rollers each provided at a position between two neighboring first rollers, each of the plurality of third rollers being positioned closer to an axial center of each of the plurality of the second rollers in a perpendicular direction perpendicular to the conveying direction and to the arrayed direction than each of the plurality of first rollers to the axial center.

4. The conveying device as claimed in claim 1, further comprising:

a discharge tray disposed downstream of the plurality of first rollers and the plurality of second rollers in the conveying direction, the discharge tray being configured to receive the recording sheet conveyed in the conveying direction by the plurality of second rollers;

a drive unit configured to apply a drive force to the slide portion; and a controller configured to drive the drive unit to move the slide portion from the fifth position to the sixth position on condition that a leading end of the recording sheet conveyed in the conveying direction has passed through the nip point, wherein the first tangent line forms a first angle with respect to a horizontal direction, and the second tangent line forms a second angle with respect to the horizontal direction, the second angle being greater than the first angle.

5. The conveying device as claimed in claim 1, wherein the slide portion includes an engaged portion, and the abutment member includes an engaging portion engageable with the engaged portion, the engaged portion extending diagonally with respect to the arrayed direction along which the slide portion moves between the fifth position and the sixth position.

6. The conveying device as claimed in claim 1, wherein the roller accommodating portion has a bottom plate and a pair of side plates, the bottom plate having a plurality of slits through which the plurality of the first rollers is inserted respectively, the pair of side plates standing from the bottom plate at a position outside of the plurality of first rollers in the arrayed direction.

7. The conveying device as claimed in claim 1, wherein the roller accommodating portion includes a plurality of shaft receiving portions each extending in the conveying direction, the shaft of each of the plurality of first rollers being inserted through the corresponding shaft receiving portion, wherein the shaft of each of the plurality of first rollers is formed of a spring, and wherein each of the plurality of first rollers is moved between the first position and the second position when the abutment member moves the shaft of the each of the plurality of first rollers along the corresponding shaft receiving portion.

8. The conveying device as claimed in claim 1, wherein the roller accommodating portion includes a plurality of shaft receiving portions each extending in the conveying direction and curved toward the corresponding second roller, the shaft of each of the plurality of first rollers being inserted through the corresponding shaft receiving portion; and wherein each of the plurality of first rollers is moved between the first position and the second position when the abutment member moves the shaft of the each of the plurality of first rollers along the corresponding shaft receiving portion.

9. The conveying device as claimed in claim 1, further comprising:

a main frame defining a first conveying path along which the plurality of first rollers and the plurality of second rollers are disposed, and a second conveying path which merges with the first conveying path at a junction positioned upstream of the plurality of first rollers and the plurality of second rollers in the conveying direction, the plurality of second rollers being further configured to convey the recording sheet to the second conveying path; and a controller configured to move the slide portion from the fifth position to the sixth position on condition that a trailing end of the recording sheet conveyed along the first conveying path in the conveying direction has reached the junction.

10. An inkjet recording apparatus comprising:

a conveying device configured to convey a recording sheet in a conveying direction, the conveying device comprising:

a plurality of first rollers arrayed at intervals in an arrayed direction perpendicular to the conveying direction, each of the plurality of first rollers having a shaft extending in the arrayed direction;

a plurality of second rollers provided in one-to-one correspondence with the plurality of first rollers, each of the plurality of second rollers being in pressure contact with the corresponding first roller and being configured to convey the recording sheet in the conveying direction while nipping the recording sheet with the corresponding first roller at a nip point; and a roller holder configured to support the plurality of first rollers such that the plurality of first rollers is movable along the conveying direction between a first position and a second position, each of the plurality of first rollers in the first position and the corresponding second roller defining a first tangent line passing through the nip point, each of the plurality of first rollers in the second position and the corresponding second roller defining a second tangent line passing through the nip point, the second tangent line being angled with respect to the first tangent line, the roller holder comprising:

a roller accommodating portion configured to accommodate the plurality of first rollers therein;

an abutment member supported by the roller accommodating portion so as to be movable along the conveying direction between a third position and a fourth position, the abutment member being configured to abut against each of the shafts of the plurality of first rollers to move each of the plurality of first rollers from the first position to the second position in response to the movement of the abutment member from the third position to the fourth position, the abutment member being further configured to abut against each of the shafts of the plurality of first rollers to move each of the plurality of first rollers from the second position to the first position in response to the movement of the abutment member from the fourth position to the third position; and a slide portion configured to abut against the abutment member, the slide portion being supported by the roller accommodating portion so as to be movable along the arrayed direction between a fifth position and a sixth position, the slide portion being configured to be moved from the fifth position to the sixth position to move the abutment member from the third position to the fourth position, the slide portion being further configured to be moved from the sixth position to the fifth position to move the abutment member from the fourth position to the third position;

a recording head configured to eject ink droplets on the recording sheet;

a carriage on which the recording head is mounted and configured to be reciprocatingly moved in the arrayed direction; and an urging member configured to urge the slide portion to the fifth position, wherein the slide portion is moved from the fifth position to the sixth position against an urging force of the urging member by abutting against the carriage moving in the arrayed direction.

* * * * *